(12) United States Patent
Wang et al.

(10) Patent No.: US 9,831,823 B1
(45) Date of Patent: Nov. 28, 2017

(54) OBSTACLE CROSSING MECHANISM AND PHOTOVOLTAIC PANEL CLEANING EQUIPMENT HAVING SAME

(71) Applicant: BOSON ROBOTICS LTD., Beijing (CN)

(72) Inventors: Guanyu Wang, Beijing (CN);
Jinggong Zhang, Beijing (CN);
Zhihong Qian, Beijing (CN)

(73) Assignee: BOSON ROBOTICS LTD., Beijing (CN)

( * ) Notice: Subject to any disclaimer, the term of this patent is extended or adjusted under 35 U.S.C. 154(b) by 0 days.

(21) Appl. No.: 15/449,999

(22) Filed: Mar. 5, 2017

Related U.S. Application Data

(62) Division of application No. 15/436,871, filed on Feb. 20, 2017, and a division of application No.
(Continued)

(30) Foreign Application Priority Data

May 13, 2016 (CN) .......................... 2016 1 0320301

(51) Int. Cl.
*A47L 1/00* (2006.01)
*H02S 40/10* (2014.01)
(Continued)

(52) U.S. Cl.
CPC .............. *H02S 40/10* (2014.12); *A46B 13/02* (2013.01); *B08B 1/002* (2013.01); *B08B 1/04* (2013.01); *B08B 3/04* (2013.01); *A46B 2200/30* (2013.01)

(58) Field of Classification Search
CPC ......... H02S 40/10; H02S 40/12; B08B 1/002; B08B 1/04; B08B 3/04; B08B 1/001;
(Continued)

(56) References Cited

U.S. PATENT DOCUMENTS

| 408,802 | A | * | 8/1889 | Hebert | .................. | A47L 11/325 |
| | | | | | | 15/114 |
| 538,145 | A | * | 4/1895 | Allen | ..................... | A47B 43/00 |
| | | | | | | 108/1 |

(Continued)

FOREIGN PATENT DOCUMENTS

| DE | 102013219460 A1 * | 3/2015 | ............. | H02S 40/10 |
| EP | 2048455 A2 * | 4/2009 | ............... | F24J 2/461 |

(Continued)

*Primary Examiner* — Joshua J Michener
*Assistant Examiner* — Devin Barnett
(74) *Attorney, Agent, or Firm* — Ding Yu Tan

(57) ABSTRACT

An obstacle crossing mechanism, adapted and arranged on a cleaning rack of a photovoltaic panel cleaning equipment configured to clean photovoltaic panel arrays is disclosed. The cleaning rack includes connecting rods detachably-connected, and fixed rods arranged on respective connecting rods. The obstacle crossing mechanism includes a moving rack and a fixed rack, in which moving rack is used for temporarily stopping photovoltaic panel cleaning equipment; and the fixed rack is located below the moving rack and the moving rack ascends or descends on the fixed rack. A telescopic mechanism is further provided with the obstacle crossing mechanism so that the two mechanisms together facilitates the photovoltaic panel cleaning equipment to travel from a photovoltaic panel array to reach another photovoltaic panel array during cleaning process of photovoltaic panels without requiring any human assistance, thus achieve total automation.

10 Claims, 17 Drawing Sheets

Related U.S. Application Data

15/445,994, filed on Mar. 1, 2017, and a division of application No. 15/445,920, filed on Feb. 28, 2017, and a division of application No. 15/449,887, filed on Mar. 3, 2017.

(51) Int. Cl.
  *B08B 1/00* (2006.01)
  *B08B 1/04* (2006.01)
  *A46B 13/02* (2006.01)
  *B08B 3/04* (2006.01)

(58) Field of Classification Search
  CPC ....... B08B 1/00; A46B 13/02; A46B 2200/30; F16M 11/18; F16M 11/32; A47L 11/38
  USPC ........ 134/172, 198, 56 R, 57 R; 15/250.001, 15/250.11, 103, 52.1, 21.1, 246; 136/244, 136/251; 211/41.1; 52/173.3
  See application file for complete search history.

(56) References Cited

U.S. PATENT DOCUMENTS

| | | | | |
|---|---|---|---|---|
| 617,090 A * | 1/1899 | Freese | A47F 5/13 | 211/130.1 |
| 677,216 A * | 6/1901 | Huebner | A47B 27/02 | 108/4 |
| 697,639 A * | 4/1902 | Lindner | A47B 23/02 | 108/5 |
| 733,100 A * | 7/1903 | Werner | A47B 23/043 | 248/456 |
| 836,551 A * | 11/1906 | Werner | A47B 27/02 | 108/9 |
| 903,821 A * | 11/1908 | Karges | A47B 37/00 | 108/31 |
| 929,989 A * | 8/1909 | Sharp | A47B 27/02 | 108/10 |
| 1,044,196 A * | 11/1912 | Lang | A47B 27/02 | 108/9 |
| 1,057,958 A * | 4/1913 | Hallock | A47B 27/02 | 108/4 |
| 1,106,418 A * | 8/1914 | Sprunger | A47B 61/00 | 108/30 |
| 1,197,763 A * | 9/1916 | Plotnitzky | B60S 1/44 | 15/250.22 |
| 1,335,857 A * | 4/1920 | Robbins | D06F 81/006 | 108/31 |
| 1,560,422 A * | 11/1925 | Hendrix | A61G 7/02 | 108/3 |
| 1,975,857 A * | 10/1934 | McKenney | A47B 3/02 | 108/119 |
| 1,990,032 A * | 2/1935 | Johanson | A47B 3/02 | 108/119 |
| 2,041,772 A * | 5/1936 | Lundquist | A47B 27/02 | 108/10 |
| 2,596,986 A * | 5/1952 | Curtis | A61G 13/105 | 108/147.22 |
| 2,795,891 A * | 6/1957 | Bishop | A47B 41/04 | 108/9 |
| 3,094,948 A * | 6/1963 | Clow | A47B 9/16 | 108/10 |
| 3,141,260 A * | 7/1964 | Dompieri | A47B 27/02 | 108/10 |
| 3,495,552 A * | 2/1970 | Dietrick | A47B 27/02 | 108/8 |
| 3,570,040 A * | 3/1971 | Wada | A47L 11/20 | 15/340.2 |
| 3,745,935 A * | 7/1973 | Douglas | A47B 27/02 | 108/1 |
| 3,805,710 A * | 4/1974 | Leshem | A47B 3/0803 | 108/124 |
| 3,827,376 A * | 8/1974 | Solomon | A47B 31/04 | 108/177 |
| 4,108,154 A * | 8/1978 | Nelson | F24J 2/14 | 126/576 |
| 4,714,224 A * | 12/1987 | Calmes | A47B 97/08 | 108/10 |
| 4,765,309 A * | 8/1988 | Legge | F24J 2/38 | 126/570 |
| 4,880,194 A * | 11/1989 | Geise | B05B 13/0285 | 211/200 |
| 4,921,302 A * | 5/1990 | Godwin | A47B 39/00 | 108/1 |
| 5,125,608 A * | 6/1992 | McMaster | F24J 2/5232 | 126/570 |
| 5,199,360 A * | 4/1993 | Koistinen | A47B 17/02 | 108/1 |
| 5,319,820 A * | 6/1994 | Forst | A47L 1/06 | 15/103 |
| 5,323,508 A * | 6/1994 | Sheldrake | A47L 1/02 | 15/103 |
| 5,730,068 A * | 3/1998 | Rioux, Jr. | A47F 5/10 | 108/3 |
| 5,885,363 A * | 3/1999 | Nakamura | B08B 1/04 | 134/6 |
| RE36,638 E * | 4/2000 | Herman | A47F 5/108 | 108/99 |
| 6,105,797 A * | 8/2000 | Haisma | A47F 5/137 | 211/130.1 |
| 6,302,032 B1 * | 10/2001 | Ranspach | A47B 97/04 | 108/12 |
| 6,321,663 B1 * | 11/2001 | Rogers | A47B 43/00 | 108/100 |
| 6,390,106 B1 * | 5/2002 | Lin | B05B 13/0468 | 134/172 |
| 6,431,319 B1 * | 8/2002 | Myers | B62B 3/02 | 187/243 |
| 6,941,876 B1 * | 9/2005 | Traino | A47B 19/06 | 108/50.11 |
| 7,051,743 B2 * | 5/2006 | Kim | B08B 3/02 | 134/102.2 |
| 8,101,849 B2 * | 1/2012 | Almy | F24J 2/525 | 126/569 |
| 8,307,606 B1 * | 11/2012 | Rego | H01L 31/05 | 126/621 |
| 8,500,918 B1 * | 8/2013 | Meller | B08B 1/008 | 134/122 R |
| 8,640,400 B2 * | 2/2014 | Liebendorfer | F24J 2/5207 | 136/251 |
| 8,661,747 B2 * | 3/2014 | Eide | F24J 2/5207 | 126/621 |
| 8,684,190 B2 * | 4/2014 | Abar | F24J 2/5233 | 126/600 |
| 8,695,290 B1 * | 4/2014 | Kim | F24J 2/5252 | 248/225.11 |
| 8,763,346 B2 * | 7/2014 | Kuster | F24J 2/5232 | 126/621 |
| 8,813,303 B1 * | 8/2014 | Meller | B08B 1/04 | 126/903 |
| 8,832,938 B2 * | 9/2014 | Gies | F24J 2/5239 | 29/890.033 |
| 8,991,117 B1 * | 3/2015 | Walker | H01L 31/0482 | 136/251 |
| 9,003,726 B2 * | 4/2015 | Sader | F24J 2/5245 | 136/251 |
| 9,016,292 B1 * | 4/2015 | Schneider | F24J 2/30 | 134/104.2 |
| 9,038,329 B2 * | 5/2015 | Pelman | F24J 2/5233 | 136/244 |
| 9,080,791 B1 * | 7/2015 | Meller | F24J 2/4607 | |
| 9,117,951 B2 * | 8/2015 | Park | H02S 20/30 | |
| 9,130,502 B1 * | 9/2015 | Aly | F24J 2/461 | |
| 9,163,861 B2 * | 10/2015 | Al-Haddad | F24J 2/525 | |
| 9,316,417 B2 * | 4/2016 | Danning | H02S 20/24 | |
| 9,444,395 B2 * | 9/2016 | Tung | F24J 2/5233 | |
| 9,455,665 B1 * | 9/2016 | Meller | H02S 40/10 | |
| 2002/0023666 A1 * | 2/2002 | Tawara | A47L 11/22 | 134/6 |

(56) References Cited

U.S. PATENT DOCUMENTS

| | | | | |
|---|---|---|---|---|
| 2002/0066473 A1* | 6/2002 | Levy | B08B 1/008 | 134/34 |
| 2004/0140002 A1* | 7/2004 | Brown | F24J 2/5245 | 136/251 |
| 2004/0255411 A1* | 12/2004 | Grey | A46B 13/001 | 15/42 |
| 2005/0034742 A1* | 2/2005 | Saito | B08B 3/00 | 134/1 |
| 2005/0268410 A1* | 12/2005 | Kaleta | A47L 11/32 | 15/42 |
| 2006/0042624 A1* | 3/2006 | Zhang | F24J 2/16 | 126/577 |
| 2006/0169300 A1* | 8/2006 | Ahn | B08B 3/04 | 134/1 |
| 2006/0169302 A1* | 8/2006 | Kozy | B08B 9/023 | 134/18 |
| 2008/0040990 A1* | 2/2008 | Vendig | F24J 2/405 | 52/173.3 |
| 2008/0283112 A1* | 11/2008 | Conger | H02S 20/10 | 136/244 |
| 2009/0152224 A1* | 6/2009 | Hsieh | B25H 1/00 | 211/170 |
| 2009/0223315 A1* | 9/2009 | Needham | F24J 2/541 | 74/471 R |
| 2009/0266353 A1* | 10/2009 | Lee | B08B 1/008 | 126/593 |
| 2009/0320907 A1* | 12/2009 | Botkin | F24J 2/5211 | 136/251 |
| 2010/0024861 A1* | 2/2010 | Cabanillas Saldana | F24J 2/542 | 136/244 |
| 2010/0043851 A1* | 2/2010 | Levy | B08B 3/02 | 134/56 R |
| 2010/0065039 A1* | 3/2010 | Chang | F24J 2/541 | 126/573 |
| 2010/0071684 A1* | 3/2010 | Cowan | F24J 2/38 | 126/605 |
| 2010/0147362 A1* | 6/2010 | King | F24J 2/4614 | 136/251 |
| 2010/0180883 A1* | 7/2010 | Oosting | F24J 2/38 | 126/574 |
| 2010/0212715 A1* | 8/2010 | Almy | F24J 2/5232 | 136/245 |
| 2010/0223865 A1* | 9/2010 | Gonzalez Moreno | F24J 2/541 | 52/173.3 |
| 2010/0237028 A1* | 9/2010 | Cusson | F24J 2/465 | 211/41.1 |
| 2010/0275975 A1* | 11/2010 | Monschke | F24J 2/5207 | 136/251 |
| 2011/0017198 A1* | 1/2011 | Ebrahimi | F24J 2/5232 | 126/602 |
| 2011/0094542 A1* | 4/2011 | Gonzalez Rodriguez | B08B 1/00 | 134/37 |
| 2011/0094549 A1* | 4/2011 | Lin | B08B 1/008 | 134/198 |
| 2011/0239554 A1* | 10/2011 | Tsuzuki | F24J 2/045 | 52/173.3 |
| 2012/0006317 A1* | 1/2012 | Sade | F24J 2/5413 | 126/600 |
| 2012/0017526 A1* | 1/2012 | Eide | H02S 20/30 | 52/173.3 |
| 2012/0048351 A1* | 3/2012 | Rizzo | F24J 2/5239 | 136/251 |
| 2012/0073219 A1* | 3/2012 | Zuritis | F24J 2/5207 | 52/173.3 |
| 2012/0073599 A1* | 3/2012 | Miya | H01L 21/67028 | 134/4 |
| 2012/0125367 A1* | 5/2012 | Monkman | B08B 1/04 | 134/18 |
| 2012/0125408 A1* | 5/2012 | Reyes | F24J 2/4638 | 136/251 |
| 2012/0132262 A1* | 5/2012 | Sagayama | H02S 20/10 | 136/251 |
| 2012/0138123 A1* | 6/2012 | Newdoll | F24J 2/461 | 136/246 |
| 2012/0222372 A1* | 9/2012 | Hilber | F24J 2/5233 | 52/173.3 |
| 2012/0223033 A1* | 9/2012 | Molek | F16B 7/18 | 211/41.1 |
| 2012/0234378 A1* | 9/2012 | West | F24J 2/5211 | 136/251 |
| 2012/0240489 A1* | 9/2012 | Rivera | F24J 2/4638 | 52/173.3 |
| 2012/0273031 A1* | 11/2012 | Sagayama | F24J 2/5233 | 136/251 |
| 2012/0311799 A1* | 12/2012 | Jaeger | B08B 1/04 | 15/4 |
| 2012/0312356 A1* | 12/2012 | Mizuo | F24J 2/5233 | 136/251 |
| 2013/0048583 A1* | 2/2013 | Kruse | F24J 2/4638 | 211/41.1 |
| 2013/0061408 A1* | 3/2013 | Woods | A46B 13/02 | 15/52.1 |
| 2013/0133275 A1* | 5/2013 | Bindschedler | F24J 2/5203 | 52/173.3 |
| 2013/0206167 A1* | 8/2013 | Mor | B08B 1/008 | 134/6 |
| 2013/0240004 A1* | 9/2013 | Ho | F24J 2/40 | 134/56 R |
| 2013/0305474 A1* | 11/2013 | Meller | B08B 1/006 | 15/246 |
| 2013/0342155 A1* | 12/2013 | Neel | H01L 31/0422 | 320/101 |
| 2014/0014165 A1* | 1/2014 | Echizenya | F24J 2/5233 | 136/251 |
| 2014/0048124 A1* | 2/2014 | Park | H02S 20/30 | 136/251 |
| 2014/0083488 A1* | 3/2014 | Song | F24J 2/5233 | 136/251 |
| 2014/0109334 A1* | 4/2014 | Saraf | B08B 1/008 | 15/246 |
| 2014/0150818 A1* | 6/2014 | Chow | B08B 1/00 | 134/6 |
| 2014/0158649 A1* | 6/2014 | Al-Haddad | F24J 2/525 | 211/41.1 |
| 2014/0158650 A1* | 6/2014 | Krantz | F24J 2/5264 | 211/41.1 |
| 2014/0182662 A1* | 7/2014 | West | F24J 2/5264 | 136/251 |
| 2014/0209145 A1* | 7/2014 | Ting | H02S 40/10 | 136/244 |
| 2014/0310906 A1* | 10/2014 | Zanatta | F24J 2/461 | 15/246 |
| 2015/0013750 A1* | 1/2015 | Meppelink | H02S 30/20 | 136/245 |
| 2015/0034575 A1* | 2/2015 | Warpup | H02S 20/10 | 211/41.1 |
| 2015/0089754 A1* | 4/2015 | Chan | B08B 7/00 | 15/94 |
| 2015/0176280 A1* | 6/2015 | Brothersen | F24J 2/5233 | 52/173.3 |
| 2015/0258581 A1* | 9/2015 | Chen | B08B 3/044 | 134/18 |
| 2015/0295533 A1* | 10/2015 | Needham | F24J 2/5233 | 136/251 |
| 2015/0306636 A1* | 10/2015 | Nagura | B08B 1/008 | 15/246 |
| 2015/0349706 A1* | 12/2015 | Grossman | H02S 40/10 | 134/6 |
| 2016/0015164 A1* | 1/2016 | Bugg | A46B 13/08 | 15/160 |
| 2016/0118927 A1* | 4/2016 | Zuritis | F24J 2/5207 | 136/251 |
| 2016/0129481 A1* | 5/2016 | Mann | A47L 1/02 | 15/320 |
| 2016/0173022 A1* | 6/2016 | Hirose | H02S 20/10 | 136/251 |

(56) References Cited

U.S. PATENT DOCUMENTS

| | | | |
|---|---|---|---|
| 2016/0193632 A1* | 7/2016 | Vahida | B08B 1/005 |
| | | | 15/93.1 |
| 2016/0254778 A1* | 9/2016 | Chou | H02S 30/10 |
| | | | 136/251 |
| 2016/0380582 A1* | 12/2016 | Park | H02S 20/10 |
| | | | 136/244 |
| 2017/0012575 A1* | 1/2017 | Newdoll | F24J 2/461 |
| 2017/0019570 A1* | 1/2017 | Meller | H02S 50/00 |
| 2017/0063293 A1* | 3/2017 | Parrott | H02S 40/10 |
| 2017/0070189 A1* | 3/2017 | Hartman | H02S 40/10 |
| 2017/0173640 A1* | 6/2017 | Grossman | H02S 40/10 |
| 2017/0179873 A1* | 6/2017 | Eitelhuber | H02S 40/10 |

FOREIGN PATENT DOCUMENTS

| | | | | |
|---|---|---|---|---|
| EP | 2422889 A1 * | 2/2012 | | B08B 1/008 |
| EP | 2441348 A1 * | 4/2012 | | A46B 13/06 |
| KR | 101417992 B1 * | 8/2014 | | H02S 40/10 |
| KR | 101451288 B1 * | 10/2014 | | |
| WO | WO 2013072711 A2 * | 5/2013 | | F24J 2/461 |
| WO | WO 2015140363 A1 * | 9/2015 | | H02S 40/10 |
| WO | WO 2016001944 A1 * | 1/2016 | | A47L 9/28 |
| WO | WO 2016052071 A1 * | 4/2016 | | A47L 11/38 |

* cited by examiner

OBSTACLE CROSSING MECHANISM AND PHOTOVOLTAIC PANEL CLEANING EQUIPMENT HAVING SAME

FIELD OF THE INVENTION

The present invention relates to the technical field of solar power generation, and in particular to an obstacle crossing mechanism configured and arranged on a cleaning rack of a photovoltaic panel cleaning equipment for cleaning photovoltaic panels.

BACKGROUND OF THE INVENTION

With the comprehensive development of global industrialization, demands of all industries in all countries for energy increase sharply, and the amount of energy demands has already been a standard for measuring the situation of economic development of a country or a region. Renewable energy mainly includes hydraulic energy, solar energy, wind energy, geothermal energy, biomass energy, etc., and the most important feature thereof is that it has a self-restoring capacity, renewable energy can be continuously replenished from the nature in a use process by people, and it is energy which is inexhaustible and will never be used up. As studied and proved by scholars, people commonly consider that solar energy and wind energy are of the most effective and feasible energy type which can solve energy crisis and environmental pollution and are of the most important energy type in a new century. Especially, solar energy is increasingly concerned about by people due to its unique advantages since solar energy is inexhaustible, will never be used up and is renewable; the application areas of solar energy are wide; solar energy is clean and pollution-free; and a solar power generator has no moving part, is not easily damaged and is simple to maintain.

All countries start to invest a great amount of capitals to construct solar photovoltaic power plants, solar photovoltaic panels are foundations for generation of electric energy in photovoltaic power plants, the power generation efficiency of the photovoltaic panels directly decides the power generation capacity of the solar power plants, and whether the surfaces of the photovoltaic panels are clean have a very great influence on the power generation capacity of the solar power plants. With the construction of more and more solar photovoltaic power plants, the number of photovoltaic panels which need to be cleaned increases sharply, and how to rapidly clean the photovoltaic panels and simultaneously guarantee the cleaning effect has already been a problem which needs to be urgently solved by photovoltaic power generation enterprises.

Typically photovoltaic panels are arranged in various geometric or evenly-distributed configurations and layouts, such as for example, more than one photovoltaic panels can be arranged or organized in one or more arrays, in which one array of photovoltaic panels are arranged at close proximity to one another and belong to a specific array grouping, etc. However, due to the extended distance in between adjacent photovoltaic panel arrays, the existing conventional photovoltaic panel cleaning equipment cannot automatically move from one photovoltaic panel array to another photovoltaic panel array and needs to be manually moved, and thus the relocating or moving operation for the conventional photovoltaic panel cleaning equipment from array to array is time-consuming and labor-consuming.

In view of the above-mentioned problems or shortcomings, the inventor of the present invention finally obtains the present invention after long-time study and practice.

SUMMARY OF THE INVENTION

For solving the above problems, an object of the present invention is to provide an obstacle crossing mechanism configured and arranged on a cleaning rack of a photovoltaic panel cleaning equipment for cleaning photovoltaic panels.

For solving the above problems, another object of the present invention is to provide a photovoltaic panel cleaning equipment having the same obstacle crossing mechanism configured therein.

The technical scheme adopted by an embodiment of the present invention lies in that an obstacle crossing mechanism is arranged on a cleaning rack of a photovoltaic panel cleaning equipment.

The cleaning rack includes a first connecting rod, a second connecting rod, a third connecting rod and a fourth connecting rod which are detachably connected, a first fixed rod being arranged on the first connecting rod, a second fixed rod and a third fixed rod being arranged between the second connecting rod and the fourth connecting rod, a fourth fixed rod being arranged on the third connecting rod.

The obstacle crossing mechanism includes a moving rack and a fixed rack, and the moving rack is used for temporarily stopping the photovoltaic panel cleaning equipment; and the fixed rack is located below the moving rack and the moving rack can ascend or descend on the fixed rack.

Preferably, the moving rack includes a first connecting member, a second connecting member, a third connecting member and a fourth connecting member, and the first connecting member, the second connecting member, the third connecting member and the fourth connecting member form a rectangular frame.

Preferably, a moving wheel and a limiting member are arranged on each of the second connecting member and the fourth connecting member.

Preferably, a sensor support used for mounting a sensor is arranged on the third connecting member.

Preferably, the fixed rack includes a bearing rack and a bearing supporting rack, and the bearing supporting rack is located below the bearing rack and is rotatably connected with the bearing rack.

Preferably, the bearing rack includes a first bearing connecting rod, a second bearing connecting rod, a third bearing connecting rod and a fourth bearing connecting rod; and a locking device is arranged between the second bearing connecting rod and the fourth bearing connecting rod, and the locking device cooperates with the limiting member to lock the moving rack on the fixed rack.

Preferably, the locking device includes a bottom plate, a locking hook, a rotary force applying member and a restoring member; one end of the bottom plate is fixed on the second bearing connecting rod and the other end is fixed on the fourth bearing connecting rod; a fixed column is arranged on the bottom plate and the locking hook is rotatably connected with the fixed column; the rotary force applying member is connected with one end of the locking hook and the rotary force applying member can outwards pull away the locking hook under an effect of external force to unlock the limiting member; and the restoring member is arranged at a junction between the rotary force applying member and the locking hook, and when the external force acting on the rotary force applying member disappears, the restoring member enables the locking hook to be restored.

Preferably, the locking device further includes a first stand column, a second stand column, a third stand column and a fourth stand column which are fixed on the bottom plate; the first stand column and the fourth stand column are located at two ends of the bottom plate, and the second stand column and the third stand column are located between the first stand column and the fourth stand column; two vertical pulleys which are respectively at a high position and a low position are arranged on each of the first stand column and the fourth stand column; and a horizontal pulley is arranged on each of the second stand column and the third stand column.

Preferably, the locking device further includes a pulling rope, and the pulling rope is wound on the vertical pulleys and the horizontal pulleys and then is connected with the rotary force applying member.

Preferably, the photovoltaic panel cleaning equipment includes a body, a telescopic mechanism being arranged on the body, and the obstacle crossing mechanism cooperates with the telescopic mechanism to enable the body to automatically move from one photovoltaic panel array to another photovoltaic panel array.

As compared with the prior art, the present invention has the beneficial effects as follow: by adopting the obstacle crossing mechanism, the photovoltaic panel cleaning equipment (having the obstacle crossing mechanism) provided by the present invention at least achieve the effect that the body of the photovoltaic panel cleaning equipment can then automatically move or traverse from one photovoltaic panel array to another photovoltaic panel array by using the obstacle crossing mechanism in cooperation with the telescopic mechanism, and the automated relocation operation of the photovoltaic panel cleaning equipment configured with the obstacle crossing mechanism achieves time-saving and labor-saving for moving between different photovoltaic panel arrays.

DETAILED DESCRIPTION OF THE PREFERRED EMBODIMENT

The above-mentioned and other technical features and advantages of the present invention will be further described below in detail with reference to the drawings:

Preferred Embodiment 1

Figure 1:
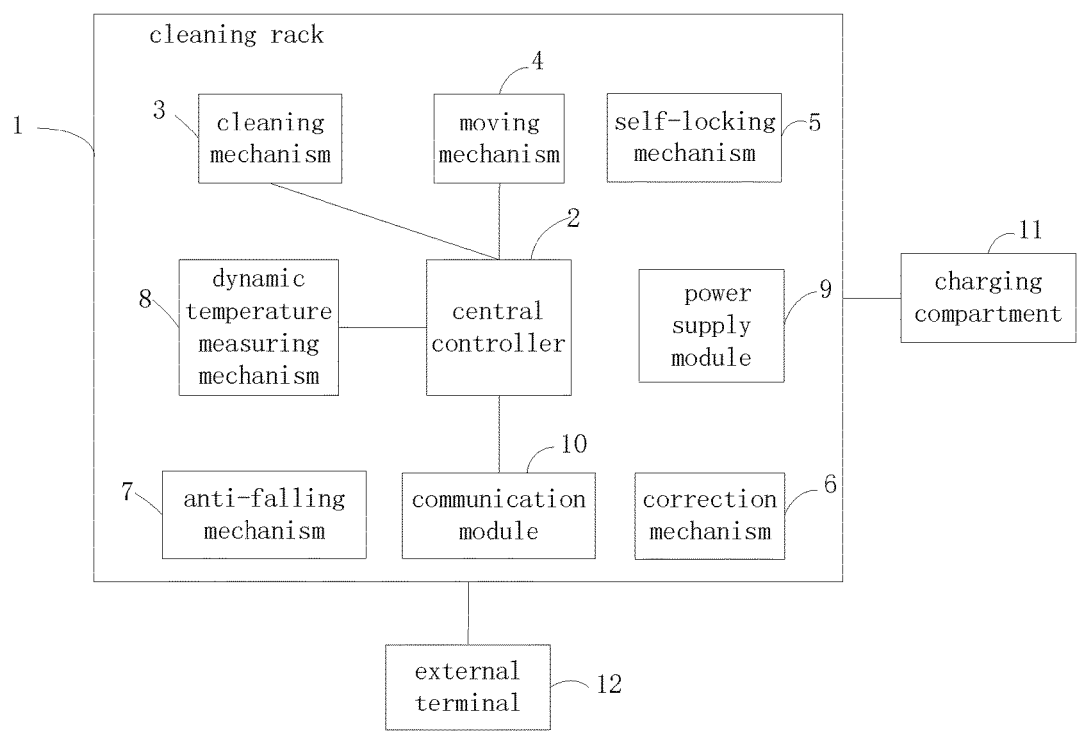
FIG. 1 illustrates a functional diagram of a photovoltaic panel cleaning equipment provided in accordance with an embodiment of the present invention.

As illustrated in FIG. 1 which illustrates a functional diagram of a photovoltaic panel cleaning equipment disclosed in accordance with an embodiment of the present invention, the photovoltaic panel cleaning equipment comprises a body, a charging compartment 11 and an external terminal 12. The body of the photovoltaic panel cleaning equipment comprises a cleaning rack 1, a central controller 2, a cleaning mechanism 3, a moving mechanism 4, a self-locking mechanism 5, a correction mechanism 6, an anti-falling mechanism 7, a dynamic temperature measuring mechanism 8, a power supply module 9 and a communication module 10, wherein the central controller 2, the cleaning mechanism 3, the moving mechanism 4, the self-locking mechanism 5, the correction mechanism 6, the anti-falling mechanism 7, the dynamic temperature measuring mechanism 8, the power supply module 9 and the communication module 10 are arranged on the cleaning rack 1. The cleaning mechanism 3 is connected with the central controller 2 and is used for cleaning a photovoltaic panel. The moving mechanism 4 is connected with the central controller 2 and is used for enabling the body to stably move on the photovoltaic panel. The self-locking mechanism 5 cooperates with the moving mechanism 4 and is used for enabling the body to be capable of moving at constant speed during movement on the photovoltaic panel and instantaneously becoming immobilized during stopping. The correction mechanism 6 is used for correcting the body when the body is inclined and then enabling the body to stably move on the photovoltaic panel again. The anti-falling mechanism 7 is used for preventing the body from falling off from the photovoltaic panel. The dynamic temperature measuring mechanism 8 is connected with the central controller 2 and is used for dynamically measuring temperature of the photovoltaic panel cleaned by the body. The charging compartment 11 is used for charging and stopping the body. The power supply module 9 is connected with all electrical parts in the body and is used for supplying power to all the electrical parts. The communication module 10 is connected with the central controller 2 and is used for realizing data interaction between the external terminal 12 and the central controller 2. The external terminal 12 is used for realizing remote control of the body.

Figure 2:
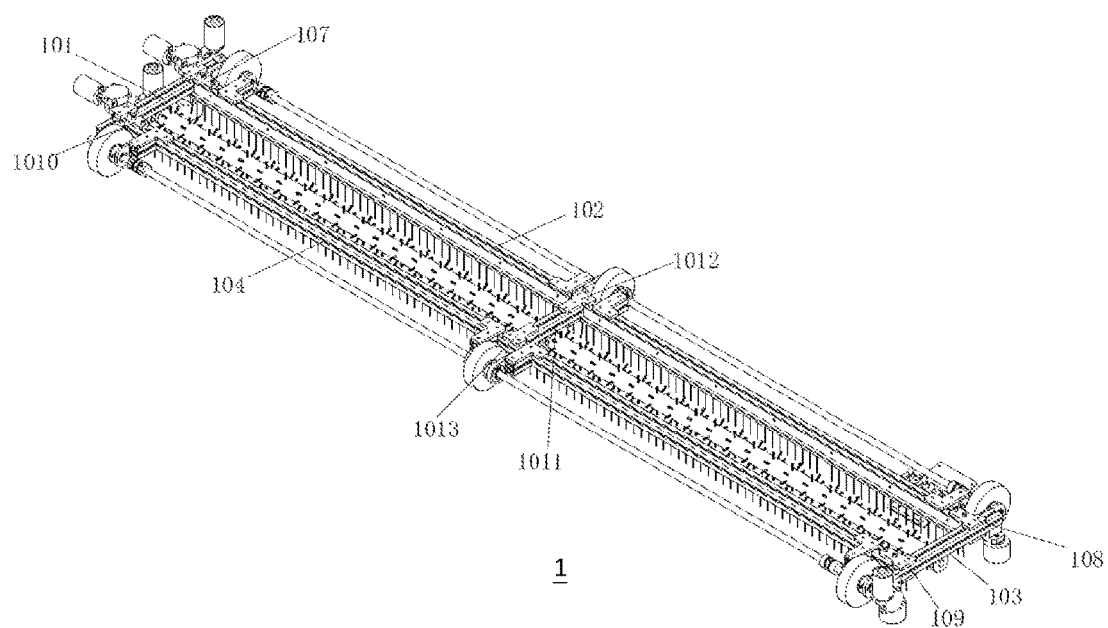
FIG. 2 illustrates a structural schematic view of a cleaning rack.
Figure 3:
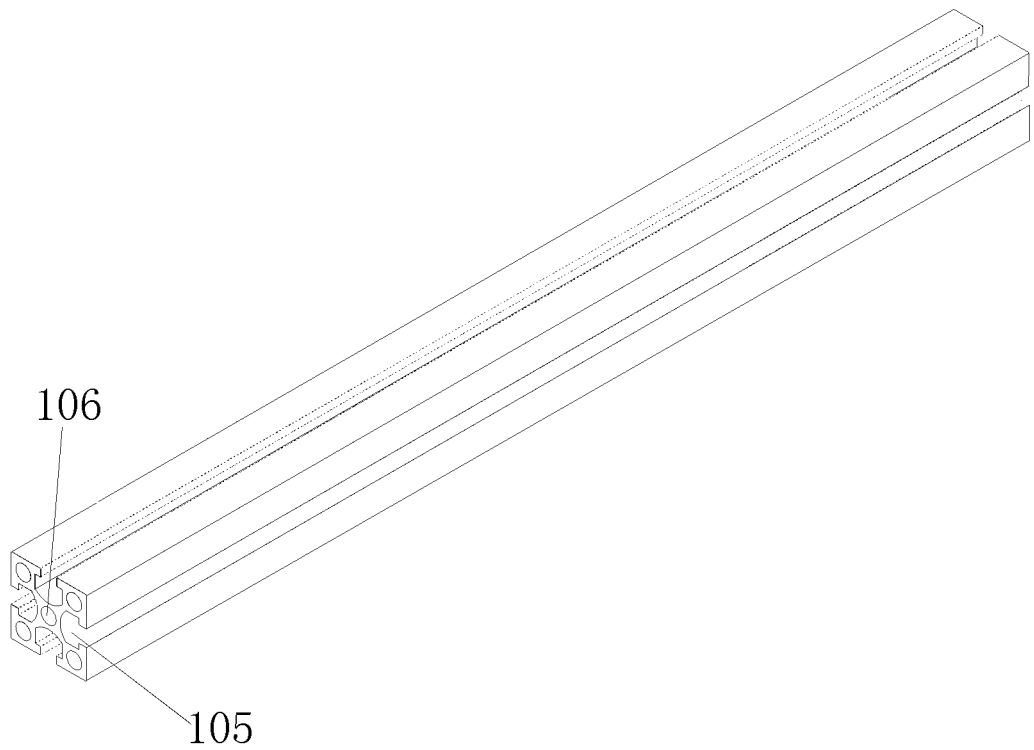
FIG. 3 illustrates a structural schematic view of a single connecting rod of the cleaning rack.

As illustrated in FIG. 2 which illustrates a structural schematic view of the cleaning rack and FIG. 3 which illustrates a structural schematic view of a single connecting rod of the cleaning rack. The cleaning rack 1 comprises a first connecting rod 101, a second connecting rod 102, a third connecting rod 103 and a fourth connecting rod 104. The first connecting rod 101, the second connecting rod 102, the third connecting rod 103 and the fourth connecting rod 104 form a frame, and preferably the frame is a rectangular frame such that the size of the body can be reduced and the flexibility thereof is improved. Preferably, the area of the cleaning rack 1 is 75% of the area of a photovoltaic panel such that not only can the cleaning effect of the photovoltaic panel be guaranteed, but also the weight of the body is not increased to prevent the photovoltaic panel from being damaged due to compression. The first connecting rod 101 and the third connecting rod 103 are used as short sides of the rectangular frame, and the second connecting rod 102 and the fourth connecting rod 104 are used as long sides of the rectangular frame. The first connecting rod 101, the second connecting rod 102, the third connecting rod 103 and the fourth connecting rod 104 are all made of an aluminum material such that the weight of the body can be reduced. Sliding grooves 105 are arranged in four side surfaces of each connecting rod of the cleaning rack. By adopting the sliding grooves, the effect of conveniently increasing or reducing other functional parts of the body can be realized. A plurality of hollow through holes 106 which run through the entire connecting rod are arranged in each connecting rod, and preferably the number of the hollow through holes 106 is five such that the weight of the body can be further reduced and the body is prevented from damaging the photovoltaic panel due to compression. One end of the second connecting rod 102 is fixedly connected with one end of the first connecting rod 101 by using a first T-shaped connecting plate 107, and the other end is fixedly connected with one end of the third connecting rod 103 by using a second T-shaped connecting plate 108; one end of the fourth connecting rod 104 is fixedly connected with the other end of the third connecting rod 103 by using a third T-shaped connecting plate 109, and the other end is fixedly connected with the other end of the first connecting rod 101 by using a fourth T-shaped connecting plate 1010; and by the connection mode of connecting all the connecting rods by using the T-shaped connecting plates, all the connecting rods in the cleaning rack 1 are detachably connected, such that the size of the cleaning rack 1 can be adjusted according to the model of the photovoltaic panel, the body can adapt to photovoltaic panels of different models and the assembling is facilitated. Since the photovoltaic panel to be cleaned and a mounting ground thereof form a certain angle, i.e., the body and the ground also form a certain angle when the body moves on the photovoltaic panel, one end, far away from the ground, of the photovoltaic panel is now called as an upper edge of the photovoltaic panel, and one end close to the ground is called as a lower edge of the photovoltaic panel. When the body is arranged on the photovoltaic panel, the first connecting rod 101 of the cleaning rack 1 is close to the upper edge of the photovoltaic panel and the third connecting rod 103 of the cleaning rack 1 is close to the lower edge of the photovoltaic panel.

Figure 4:
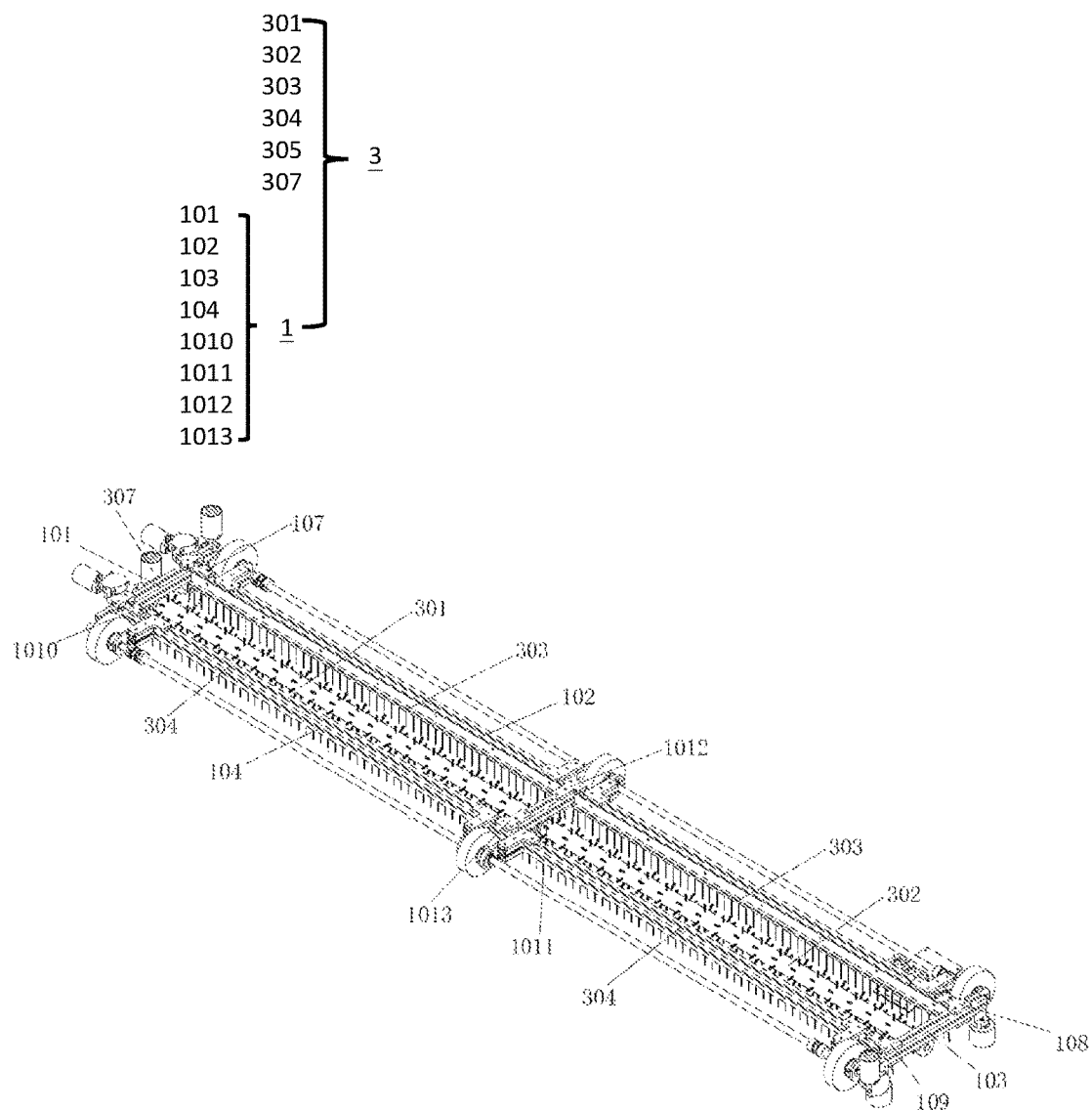
FIG. 4 illustrates a structural schematic view of a cleaning mechanism.

As illustrated in FIG. 4 which illustrates a structural schematic view of the cleaning mechanism, the cleaning mechanism 3 comprises a cleaning rack, a cleaning member, a sweeping member and a cleaning member power unit. The cleaning member is used for stripping off adhesive materials on the photovoltaic panel, the sweeping member is used for sweeping away the stripped-off adhesive materials, and the cleaning member power unit is used for providing power to the cleaning member. Connection between the cleaning member and the cleaning rack and connection between the sweeping member and the cleaning rack are detachable connection such that the replacement and maintenance are easy to perform. Through the cooperation between the cleaning member and the sweeping member, the cleaning effect of the photovoltaic panel can be effectively improved.

The cleaning member comprises a first rolling brush 301 and a second rolling brush 302 which are coaxially connected. In a cleaning process, the first rolling brush 301 and the second rolling brush 302 simultaneously rotate. The cleaning rack further comprises a fifth connecting rod 1011, one end of the fifth connecting rod 1011 is fixedly connected with the second connecting rod 102 by using a fifth T-shaped connecting plate 1012 and the other end is fixedly connected with the fourth connecting rod 104 by using a sixth T-shaped connecting plate 1013. One end of the first rolling brush 301 is detachably mounted on the first connecting rod 101 and the other end is detachably mounted on the fifth connecting rod 1011. One end of the second rolling brush 302 is detachably mounted on the third connecting rod 103 and the other end is detachably mounted on the fifth connecting rod 1011. Of course, the cleaning member is not limited to the combination of the two rolling brushes, i.e. the first rolling brush 301 and the second rolling brush 302, the number of the rolling brushes may be adjusted according to the actual need, and for example, when the width of the photovoltaic panel to be cleaned is greater, the number of the rolling brushes may be increased.

Figure 5:
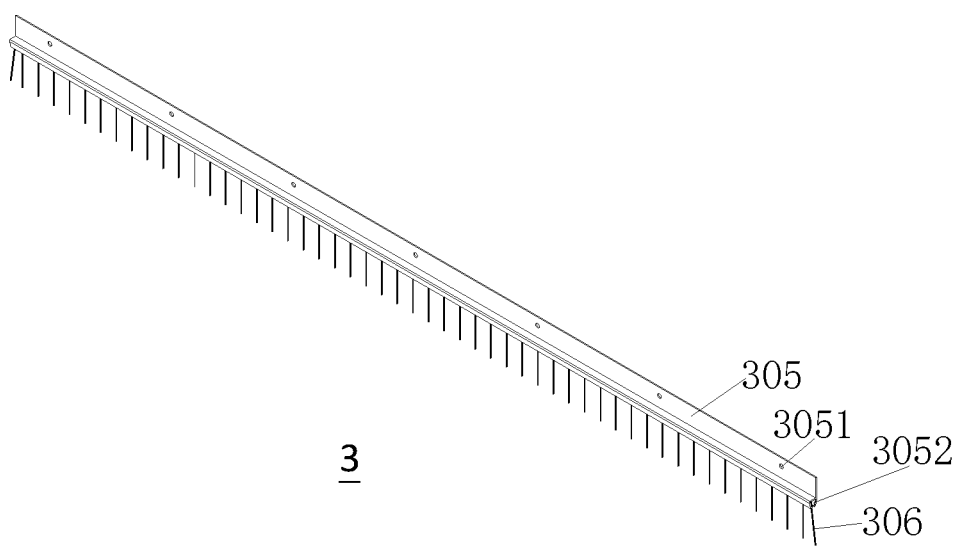
FIG. 5 illustrates a structural schematic view of a strip brush.

The sweeping member comprises two first strip brushes 303 and two second strip brushes 304. The two first strip brushes 303 are both detachably mounted on the second connecting rod 102 and the two second strip brushes 304 are both detachably mounted on the fourth connecting rod 104. The structures of the strip brushes are the same. As illustrated in FIG. 5 which illustrates a structural schematic view of a strip brush, each strip brush comprises a strip brush rack 305 and a plurality of bristles 306, mounting holes 3051 are arranged in the strip brush rack 305, screws penetrate through the mounting holes 3051 to fix the strip brush rack 305 on the connecting rod, certain ends of the bristles 306 are fixed in bristle grooves 3052 in the strip brush rack 305, preferably the bristle grooves 3052 is filled with binder to fix the bristles 306 on the strip brush rack 305, and thereby in the cleaning process, the bristles can be effectively prevented from falling off and the service life of the sweeping member is prolonged. Since the sweeping member and the cleaning rack are detachably connected, the sweeping member can be conveniently replaced at any time. Preferably, the bristles 306 are made of nylon. By adopting nylon, the bristles 306 can be directly molten and solidified in the bristle grooves 3052 such that binder does not need to be used and the cost is reduced. Of course, the sweeping member is not limited to the combination of the two first strip brushes 303 and the two second strip brushes 304, the number of the strip brushes may be adjusted according to the actual need, and when the width of the photovoltaic panel to be cleaned is greater, the number of the strip brushes may be increased.

The cleaning member power unit comprises a rolling brush motor 307, the rolling brush motor 307 is mounted on the first connecting rod 101, of course may also be mounted on the third connecting rod 103 and is connected with the central controller 2, and the rolling brush motor 307 can be controlled to work by using the central controller 2 to control the cleaning member to rotate. The cleaning member power unit further comprises a self-locking device (which is similar or same as the self-locking unit of the self-locking mechanism 5), the self-locking device is located between the rolling brush motor 307 and the cleaning member, and when the rolling brush motor 307 is shut down (or stops), the cleaning member can be enabled to instantaneously stop rotating such that the cleaning member is prevented from idling, the unnecessary wear between the cleaning member and the photovoltaic panel is reduced and meanwhile sundries can be prevented from being twisted thereon.

The self-locking device comprises a worm gear and a worm. A power output shaft of the rolling brush motor 307 is connected with the worm, the worm is connected with the worm gear, and the worm gear and the first rolling brush 301 of the cleaning member are coaxially connected. When the rolling brush motor 307 is controlled to work by using the central controller, the power output shaft of the rolling brush motor 307 drives the worm to rotate, the worm drives the worm gear to rotate, the worm gear drives the first rolling brush 301 to rotate, the second rolling brush 302 also simultaneously rotates along with the first rolling brush 301, the bristles on the first rolling brush 301 and the second rolling brush 302 are quickly in contact with the panel surface of the photovoltaic panel to strip off the adhesive materials adhered onto the panel surface of the photovoltaic panel, the stripped-off adhesive materials are swept away by the first strip brushes 303 and the second strip brushes 304, and the rolling brush motor 307 is controlled to stop or shut off by using the central controller when sweeping is finished. Since the worm can drive the worm gear only and the worm gear cannot drive the worm, when the rolling brush motor 307 stops or shut off, the first rolling brush 301 and the second rolling brush 302 will instantaneously stop rotating.

Sometimes the adhesive materials on the photovoltaic panel are tightly adhered to the panel surface, and it is difficult to strip off the adhesive materials from the panel surface of the photovoltaic panel by solely using the cleaning member. The cleaning mechanism on the body of the photovoltaic panel cleaning equipment provided by the embodiment of the present invention further comprises a water spray device. The water spray device can spray water onto the photovoltaic panel to wet the adhesive materials (so as to possibly soften the adhesive materials for easier removal thereof) and as well as providing an effect of cooling down the photovoltaic panel.

Figure 6A:
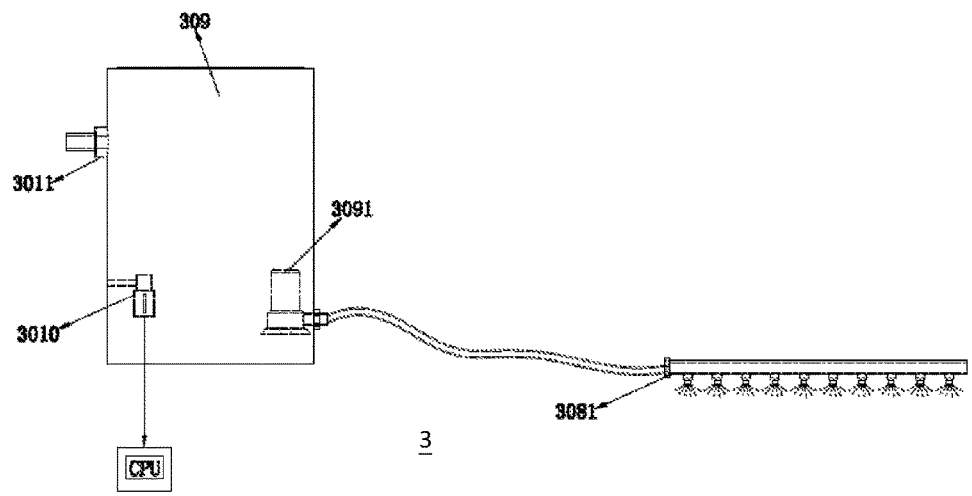
FIGS. 6A and 6B illustrate a plurality of structural schematic views of a water spray device.
Figure 6B:
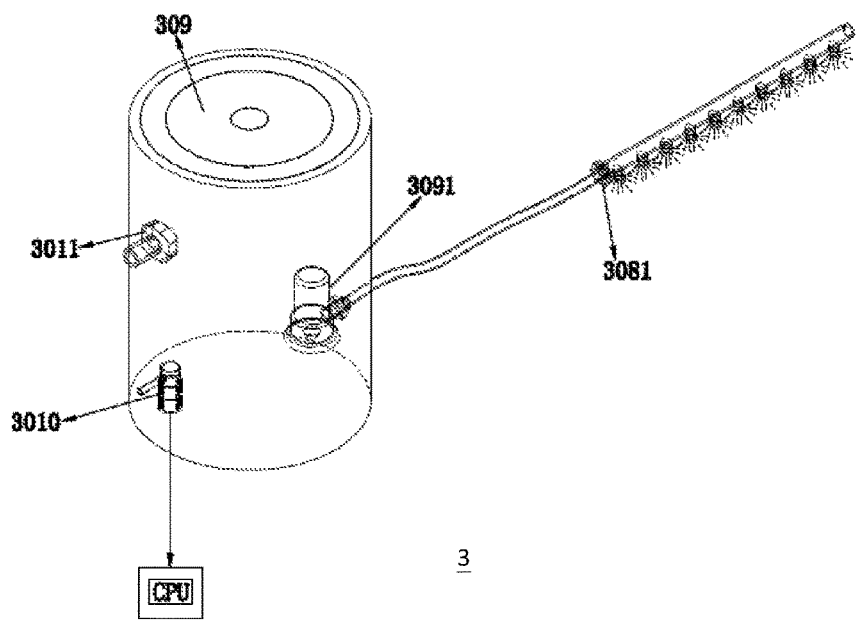

As illustrated in FIGS. 6A and 6B which illustrates a structural schematic view of the water spray device, the water spray device comprises a water spray pipe 308 and a water storage tank 309. The water spray pipe 308 is communicated with the water storage tank 309. The water spray pipe 308 is detachably mounted on the sweeping member, and a plurality of spray nozzles 3081 used for atomizing water are arranged in the water spray pipe 308. The water storage tank 309 is detachably mounted on the cleaning rack 1, a water pressure pump 3091 is mounted in the water storage tank 309, and the water pressure pump 3091 is connected with the water spray pipe 308 and can pump water in the water storage tank 309 into the water spray pipe 308. The water pressure pump 3091 is connected with the central controller 2. The water pressure pump 3091 can be controlled to be started up and shut down at any time through using the central controller 2 such that the water pressure pump 3091 is controlled to spray water for cleaning the photovoltaic panel according to the need. Atomized water sprayed out by the spray nozzles 3081 can wet the photovoltaic panel in large area (and soften the adhesive materials thereon), and not only can the water be saved, but also the cleaning effect/performance of the photovoltaic panel can be improved. Besides, since the atomized water sprayed out by the spray nozzles 3081 can cover the photovoltaic panel in larger area, the water left remaining on the photovoltaic panel will be evaporated after the remained behind water is illuminated or irradiated by sunlight, and heat on the photovoltaic panel will be taken away or removed during evaporation of the remained-behind water, such that the photovoltaic panel is cooled down and the power generation efficiency of the photovoltaic panel is thereby improved.

In order to accurately assess or know the situation or condition for detecting the amount of water in the water storage tank 309, a water amount detection and alarm device 3010 is further arranged in the water storage tank 309, alarm information is given out when the water amount detection and alarm device 3010 detects that the water storage tank 309 is in shortage of water and thereby a user is notified to replenish the water storage tank 309 with water. The water amount detection and alarm device 3010 can be implemented by a conventional water level indicator alarm available on the market. In order to enable the user to conveniently replenish the water storage tank 309 with water, the water spray device further comprises a water suction device 3011. Preferably, the water suction device is arranged on the water storage tank 309, and can be implemented by a conventional water pump. When the water amount detection and alarm device 3010 gives out alarm information, the user controls the body of the photovoltaic panel cleaning equipment by using the central controller to rapidly move to a water tank at a water getting point, and the water suction device 3011 sucks water from the external water tank and replenishes the water storage tank 309 with the water. Thereby, the body of the photovoltaic panel cleaning equipment can be enabled to be always under an optimum cleaning condition. The water spray device further comprises a path recording unit. The path recording unit is respectively connected with the water amount detection and alarm device and the central controller. When the water amount detection and alarm device detects that the water storage tank 309 is in shortage of water, the path recording unit can record distance data of movement of the body of the photovoltaic panel cleaning equipment from a water shortage point to the water getting point. After water is obtained, the central controller controls the body to move to the position of the water shortage point according to the distance data and then controls the cleaning mechanism to continuously perform remaining cleaning work until completion.

Figure 7:
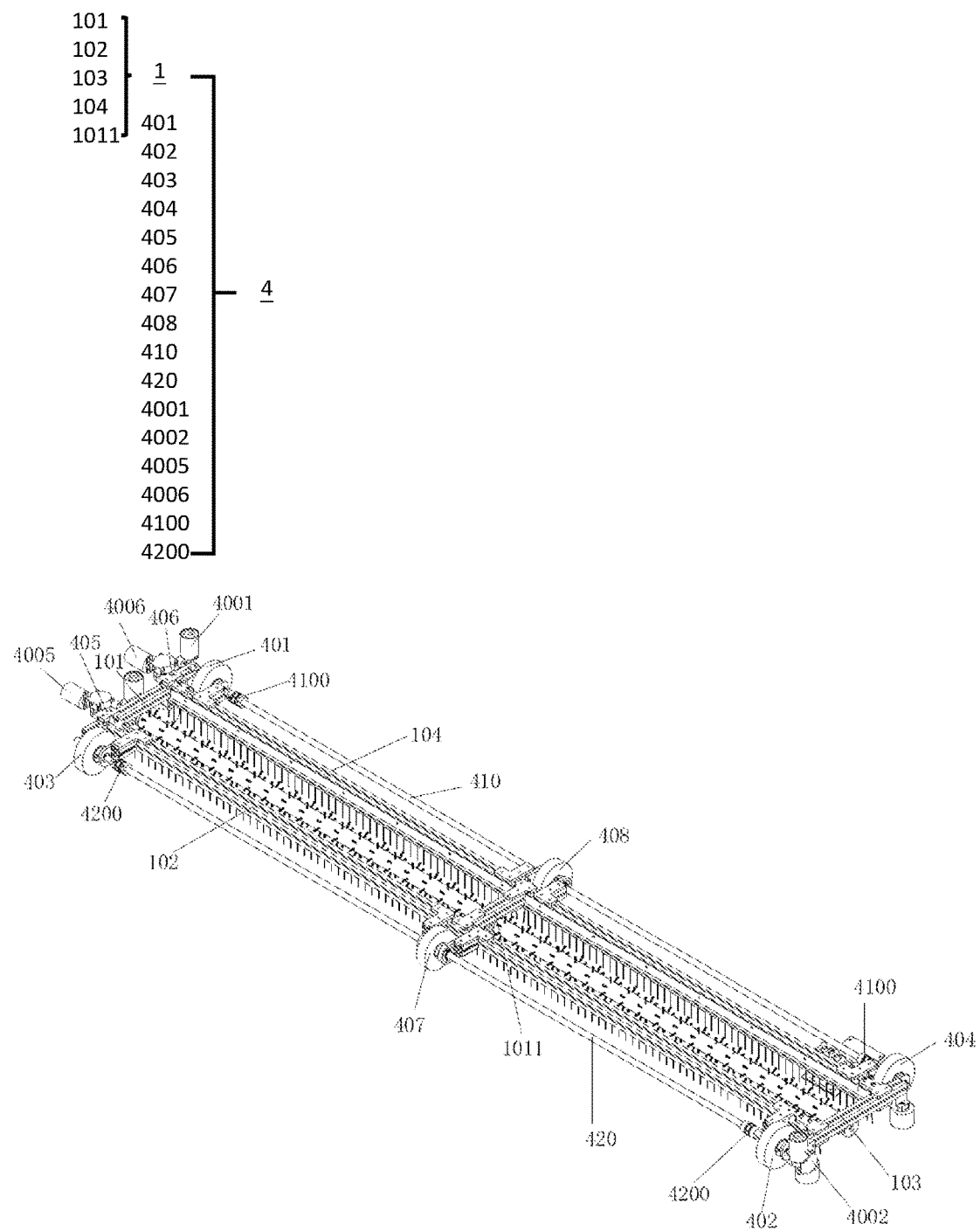
FIG. 7 illustrates a structural schematic view of a moving mechanism.

As illustrated in FIG. 7 which illustrates a structural schematic view of the moving mechanism 4, the moving mechanism 4 comprises a cleaning rack, a plane walking unit and a side surface walking unit. The plane walking unit is located below the cleaning rack and the side surface walking unit is located on one side of the cleaning rack. When the body of the photovoltaic panel cleaning equipment moves on the photovoltaic panel, the plane walking unit is in contact with the panel surface of the photovoltaic panel, the side surface walking unit is in contact with the side surface of the upper edge of the photovoltaic panel, and an effect of preventing the body from falling off from the photovoltaic panel can also be achieved.

The plane walking unit comprises a first driving wheel 401, a first driving motor 4001, a second driving wheel 402, a second driving motor 4002, a first driven wheel 403 and a second driven wheel 404. The first driving wheel 401 is detachably mounted at a junction between the first connecting rod 101 and the fourth connecting rod 104, and the second driving wheel 402 is detachably mounted at a junction between the third connecting rod 103 and the second connecting rod 102, i.e., the first driving wheel 401 and the second driving wheel 402 are diagonally mounted on one diagonal line of the cleaning rack 1. Thereby, when the body moves forwards or backwards on the photovoltaic panel, the acting pushing force is uniform and the body can be enabled to stably move on the photovoltaic panel. The first driven wheel 403 is detachably mounted at a junction between the first connecting rod 101 and the second connecting rod 102, and the second driven wheel 404 is detachably mounted at a junction between the fourth connecting rod 104 and the third connecting rod 103, i.e., the two driven wheels are diagonally mounted on the other diagonal line of the cleaning rack 1. Of course, the first driving wheel 401 and the second driving wheel 402 may also be arranged on a single side, and one or both of the first driven wheel 403 and the second driven wheel 404 may also be replaced with a driving wheel/driving wheels. The plane walking unit further comprises a third driven wheel 407 and a fourth driven wheel 408, the third driven wheel 407 is detachably mounted at a junction between the fifth connecting rod 1011 and the second connecting rod 102, and the fourth driven wheel 408 is detachably mounted at a junction between the fifth connecting rod 1011 and the fourth connecting rod 104. Thereby, the pressure applied by the body to the photovoltaic panel can be more evenly distributed such that the pressure of the body is prevented from being concentrated on the two sides of the photovoltaic panel and causing damages to the photovoltaic panel. The first driving wheel 401, the second driven wheel 404 and the fourth driven wheel 408 are connected through a first axle rod 410, and first couplings 4100 are arranged at the two ends of the first axle rod 410. The second driving wheel 402, the first driven wheel 403 and the third driven wheel 407 are connected through a second axle rod 420, and second couplings 4200 are arranged at the two ends of the second axle rod 420. By arranging the axle rods, the operation stability of the body can be improved. The first driving motor 4001 drives the first driving wheel 401 to rotate, the first axle rod 410 is driven to rotate, and further the second driven wheel 404 and the fourth driven wheel 408 are driven to rotate. The second driving motor 4002 drives the second driving wheel 402 to rotate, the second axle rod 420 is driven to rotate, and further the first driven wheel 403 and the third driven wheel 407 are driven to rotate.

The side surface walking unit comprises a third driving wheel 405, a third driving motor 4005, a fourth driving wheel 406 and a fourth driving motor 4006. The third driving wheel 405 and the fourth driving wheel 406 are both detachably mounted on the first connecting rod 101. The first driving motor 4001, the second driving motor 4002, the third driving motor 4005 and the fourth driving motor 4006 are all connected with the central controller 2. The working states of the driving motors can be controlled by using the central controller 2 such that the body is controlled to move back and forth on the photovoltaic panel.

Figure 8:
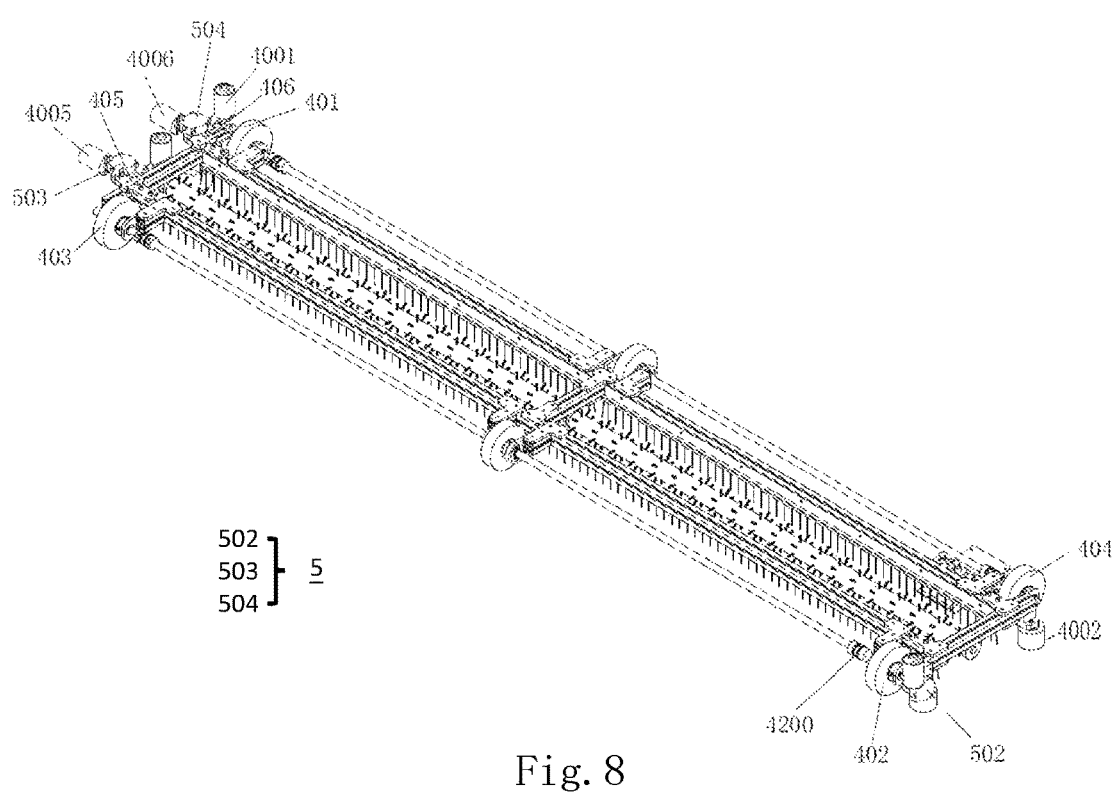
FIG. 8 illustrates a structural schematic view of a self-locking mechanism mounted on the moving mechanism.

As illustrated in FIG. 8 which illustrates a structural schematic view of the self-locking mechanism mounted on the moving mechanism, the self-locking mechanism comprises a first self-locking unit 501 and a second self-locking unit 502 which are arranged in the plane walking unit. The first self-locking unit 501 is arranged between the first driving motor 4001 and the first driving wheel 401 and is used for realizing self-locking of the first driving wheel 401; and the second self-locking unit 502 is arranged between the second driving motor 4002 and the second driving wheel 402 and is used for realizing self-locking of the second driving wheel 402.

The first self-locking unit 501 comprises a worm gear and a worm, a power output shaft of the first driving motor 4001 is connected with the worm, the worm is connected with the worm gear, the worm gear and the first driving wheel 401 are coaxially connected, the first driving motor 4001 is controlled to work by using the central controller 2, the power output shaft of the first driving motor 4001 drives the worm to rotate, the worm drives the worm gear to rotate and the worm gear drives the first driving wheel 401 to rotate; and when the first driving motor 4001 stops working, since the worm can drive the worm gear only and the worm gear cannot drive the worm, the first driving wheel 401 stops rotating once the first driving motor 4001 stops working such that the self-locking of the first driving wheel 401 is realized.

The second self-locking unit 502 comprises a worm gear and a worm, a power output shaft of the second driving motor 4002 is connected with the worm, the worm is connected with the worm gear, the worm gear and the second driving wheel 402 are coaxially connected, the second driving motor 4002 is controlled to work by using the central controller 2, the power output shaft of the second driving motor 4002 drives the worm to rotate, the worm drives the worm gear to rotate and the worm gear drives the second driving wheel 402 to rotate; and when the second driving motor 4002 stops or shut off, since the worm can drive the worm gear only and the worm gear cannot drive the worm, the second driving wheel 402 stops rotating once the second driving motor 4002 stops or shut off, such that the self-locking of the second driving wheel 402 is realized. The self-locking mechanism further comprises a third self-locking unit 503 and a fourth self-locking unit 504 which are arranged in the side surface walking unit. The third self-locking unit 503 is arranged between the third driving motor 4005 and the third driving wheel 405 and is used for realizing self-locking of the third driving wheel 405; and the fourth self-locking unit 504 is arranged between the fourth driving motor 4006 and the fourth driving wheel 406 and is used for realizing self-locking of the fourth driving wheel 406.

The third self-locking unit 503 comprises a worm gear and a worm, a power output shaft of the third driving motor 4005 is connected with the worm, the worm is connected with the worm gear, the worm gear and the third driving wheel 405 are coaxially connected, the third driving motor 4005 is controlled to work by using the central controller 2, the power output shaft of the third driving motor 4005 drives the worm to rotate, the worm drives the worm gear to rotate and the worm gear drives the third driving wheel 405 to rotate; and when the third driving motor 4005 stops or power off, since the worm can drive the worm gear only and the worm gear cannot drive the worm, the third driving wheel 405 stops rotating once the third driving motor 4005 stops or shut off, such that the self-locking of the third driving wheel 405 is realized.

The fourth self-locking unit 504 comprises a worm gear and a worm, a power output shaft of the fourth driving motor 4006 is connected with the worm, the worm is connected with the worm gear, the worm gear and the fourth driving wheel 406 are coaxially connected, the fourth driving motor 4006 is controlled to work by using the central controller 2, the power output shaft of the fourth driving motor 4006 drives the worm to rotate, the worm drives the worm gear to rotate and the worm gear drives the fourth driving wheel 406 to rotate; and when the fourth driving motor 4006 stops or shut off, since the worm can drive the worm gear only and the worm gear cannot drive the worm, the fourth driving wheel 406 stops rotating once the fourth driving motor 4006 stops or shut off, such that the self-locking of the fourth driving wheel 406 is realized.

The worm gears and worms in the self-locking mechanism 5 can enable the body of the photovoltaic panel cleaning equipment to move at constant speed on the photovoltaic panel, such that the cleaning effect or performance of the photovoltaic panel is guaranteed or improved. Besides, the self-locking mechanism can also enable the body to instantaneously stop on the photovoltaic panel such that the body is prevented from running out of the photovoltaic panel due to inertia and the body can be prevented from falling down due to the effect of gravity when the body is stopped on the photovoltaic panel with a gradient with respect to the ground.

Figure 9:
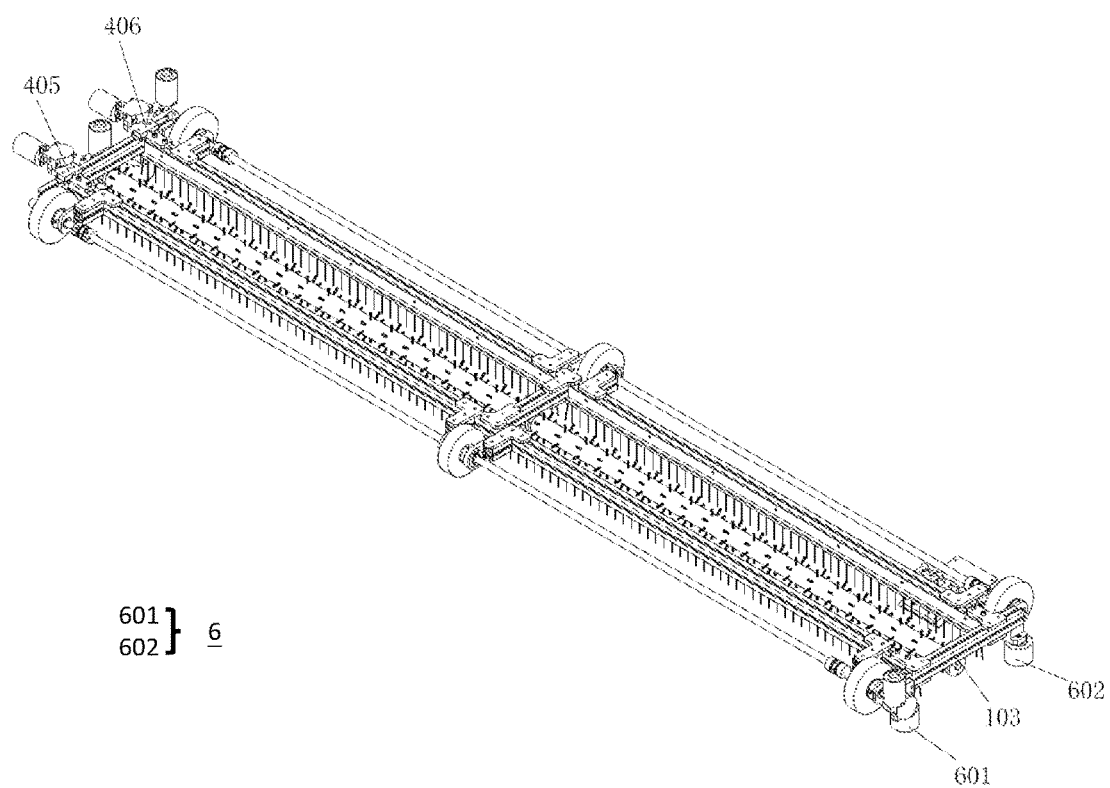
FIG. 9 illustrates a structural schematic view of a correction mechanism mounted on the cleaning rack.

The photovoltaic panels can be arranged in sequence or order as a photovoltaic panel array, and since the photovoltaic panels in the photovoltaic panel array may be not be arranged properly in flush (or not aligned in an organized manner) for a reason of being that the mounting ground or the body is caused to be inclined and even shake or shaking on the photovoltaic panel array during cleaning operation when the power drawn (electric power provided to) the body is not uniform or consistent, the body cannot stably move and thereby the cleaning effect/performance of the photovoltaic panels is reduced. Therefore, the body further comprises a correction mechanism 6. As illustrated in FIG. 9 which illustrates a structural schematic view of the correction mechanism 6 mounted on the cleaning rack 1, the correction mechanism 6 comprises a first correction guide wheel 601 and a second correction guide wheel 602. The first correction guide wheel 601 and the second correction guide wheel 602 are both detachably-mounted on the third connecting rod 103.

Figure 10:
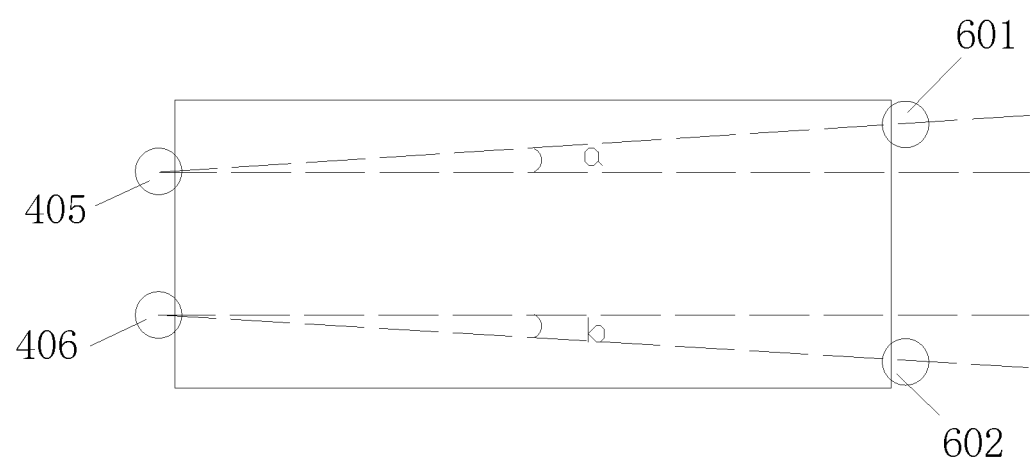
FIG. 10 illustrates a schematic view of an included angle between a correction guide wheel and a driving wheel.

As illustrated in FIG. 10 which illustrates a schematic view of an included angle between a correction guide wheel and a driving wheel, the first correction guide wheel 601 and the third driving wheel 405 form an included angle of a, where 0°<a≤5°; the second correction guide wheel 602 and the fourth driving wheel 406 form an included angle of b, where 0°<b≤5°; and preferably, the included angle a is equal to the included angle b. Since the first correction guide wheel 601 and the third driving wheel 405 form the included angle a and the second correction guide wheel 602 and the fourth driving wheel 406 form the included angle b, when the body is not inclined on the photovoltaic panel, the first correction guide wheel 601 and the second correction guide wheel 602 are not in contact with the side surface of the lower edge of the photovoltaic panel, and only when the body is inclined on the photovoltaic panel and an inclination angle c satisfies 0°<c≤5°, the first correction guide wheel 601 and the second correction guide wheel 602 are in contact with the side surface of the lower edge of the photovoltaic panel, such that the body can stably move on the photovoltaic panel without shaking.

Sometimes an included angle between the photovoltaic panel to be cleaned and the ground is possibly close to 90°, when the body moves on the photovoltaic panel at this moment, the body may fall off from the photovoltaic panel. The body further comprises an anti-falling mechanism 7. The anti-falling mechanism 7 is detachably mounted on the cleaning rack 1 and is used for preventing the body from falling off from the photovoltaic panel.

Figure 11:
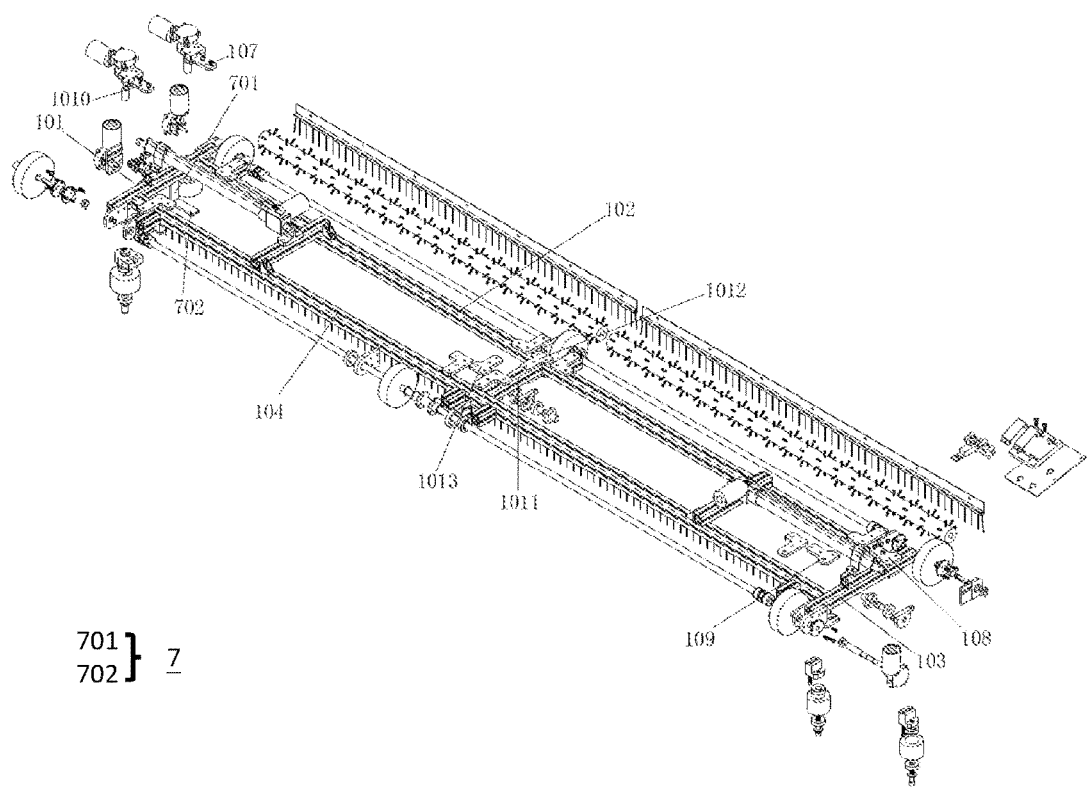
FIG. 11 illustrates a structural schematic view of an anti-falling mechanism mounted on the cleaning rack.

As illustrated in FIG. 11 which illustrates a structural schematic view of the anti-falling mechanism mounted on the cleaning rack, the anti-falling mechanism comprises a first hook and a second hook. Of course, the anti-falling mechanism may also adopt just one hook instead of two hooks. The first hook and the second hook are detachably mounted on the first connecting rod 101. Each of the first hook and the second hook comprises a fixed part 701 and an anti-falling part 702, the fixed part 701 is used for being fixed on the cleaning rack 1 by using screws and the anti-falling part 702 is used for fastening the photovoltaic panel. Preferably, the fixed part 701 and the anti-falling part 702 are connected perpendicular to each other, i.e., the first hook and the second hook are both in L-shaped structures. When the body normally moves on the photovoltaic panel, the anti-falling parts 702 of the first hook and the second hook are not in contact with the photovoltaic panel. Preferably, the first hook and the second hook are respectively and detachably mounted on the two sides of the rolling brush motor 307. Thereby, when the body is hung on the photovoltaic panel, the pressure or force applied by the body to the upper edge of the photovoltaic panel can be better distributed to prevent the photovoltaic panel from being damaged.

Figure 12:
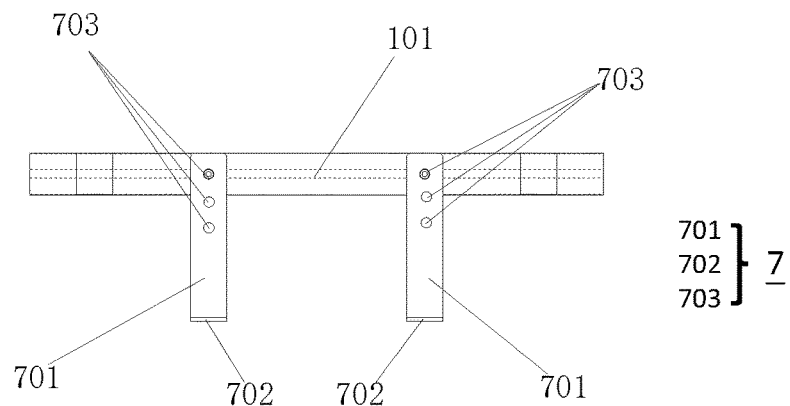
FIG. 12 illustrates a structural schematic view of another anti-falling mechanism mounted on the cleaning rack.

As illustrated in FIG. 12 which illustrates a structural schematic view of another anti-falling mechanism mounted on the cleaning rack, a difference between the hook in the anti-falling mechanism and the hook illustrated in FIG. 11 lies in that a plurality of through holes 703 are vertically arranged in the respective fixed part of the first hook and the second hook, screws are inserted into different through holes and are tightened with the cleaning rack, and thereby the adjustment of the distance between the anti-falling part 702 of the hook and the cleaning rack can be realized such that the anti-falling mechanism can better adapt to photovoltaic panels with different thickness.

There are a great number of photovoltaic panel arrays in a solar photovoltaic power plant. In an operation process, some photovoltaic panels are inevitably damaged. It is time-consuming and labor-consuming to manually observe or detect as to whether a certain/particular photovoltaic panel is damaged. Therefore, the body of the photovoltaic panel cleaning equipment in the embodiments of the present application comprises a dynamic temperature measuring mechanism which is arranged on the cleaning rack and is used for dynamically measuring temperature of the photovoltaic panel and measuring the position of the body on the photovoltaic panel. In an embodiment, the dynamic temperature measuring mechanism can be a commercially available dynamic temperature sensor and recording device.

Figure 13:
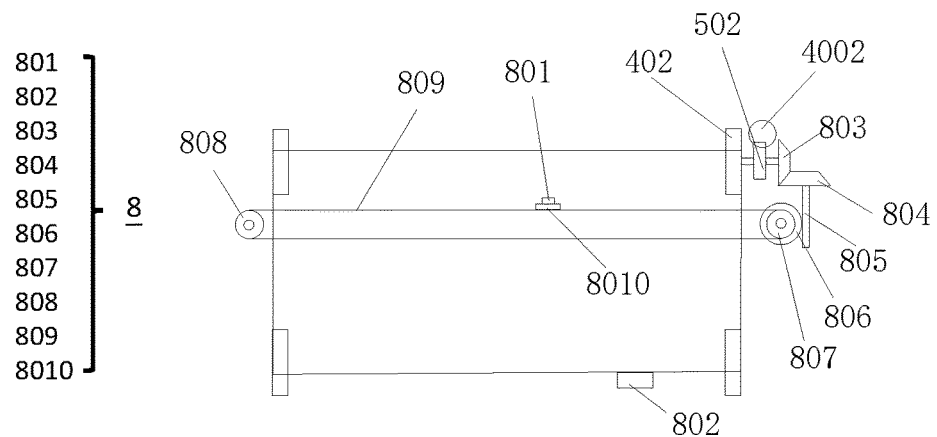
FIG. 13 illustrates a structural schematic view of a dynamic temperature measuring mechanism mounted on the cleaning rack.

As illustrated in FIG. 13 which illustrates a structural schematic view of the dynamic temperature measuring mechanism mounted on the cleaning rack, the dynamic temperature measuring mechanism 8 comprises a temperature probe 801, a probe moving device and a position measuring device 802. The temperature probe 801 is used for acquiring the temperature of the photovoltaic panel and transmitting temperature data to the central controller 2. Preferably, a wireless transmission mode is adopted for transmission. The probe moving device is used for driving the temperature probe 801 to move on the photovoltaic panel. The position measuring device 802 is used for acquiring position data of the body on the photovoltaic panel and transmitting the position data to the central controller. Preferably, a wireless transmission mode is adopted for transmission.

The probe moving device comprises a first gear 803, a second gear 804, a first worm 805, a first worm gear 806, a first conveyor wheel 807, a second conveyor wheel 808 and a conveyor belt 809. The first gear 803 is coaxially connected with the worm gear in the second self-locking unit 502, the second gear 804 is engaged with the first gear 803, the first worm gear 806 is connected with the second gear 804 by using the first worm 805, the first conveyor wheel 807 is coaxially connected with the first worm gear 806, the second conveyor wheel 808 is connected with the first conveyor wheel 807 by using the conveyor belt 809, a probe support 8010 is arranged on the conveyor belt 809 and the temperature probe 801 is mounted on the probe support 8010. When the second driving motor 4002 is driven or powered on, the worm gear in the second self-locking unit 502 is driven to rotate, the worm gear in the second self-locking unit 502 drives the first gear 803 to rotate, the first gear 803 drives the second gear 804 to rotate, the second gear 804 drives the first worm 805 to rotate, the first worm 805 drives the first worm gear 806 to rotate, the first worm gear 806 drives the first conveyor wheel 807 to rotate, the first conveyor wheel 807 drives the conveyor belt 809 to rotate and thereby the temperature probe 801 is driven to move. The central controller 2 judges whether there are damaged photovoltaic panels in the photovoltaic panels through which the body passes according to the acquired temperature data and position data. If there are damaged photovoltaic panels, the central controller will notify maintenance personnel about the position information of the damaged photovoltaic panels by using a display device or by means of short messages or voice messages, such that the maintenance personnel maintain the damaged photovoltaic panels as soon as possible.

Figure 14:
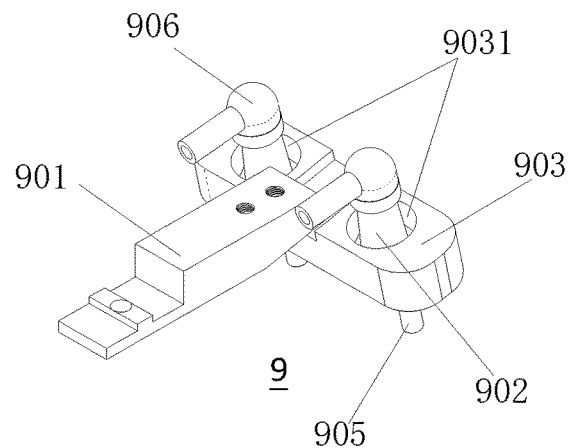
FIG. 14 illustrates a stereoscopic view of a charging connector.
Figure 15:
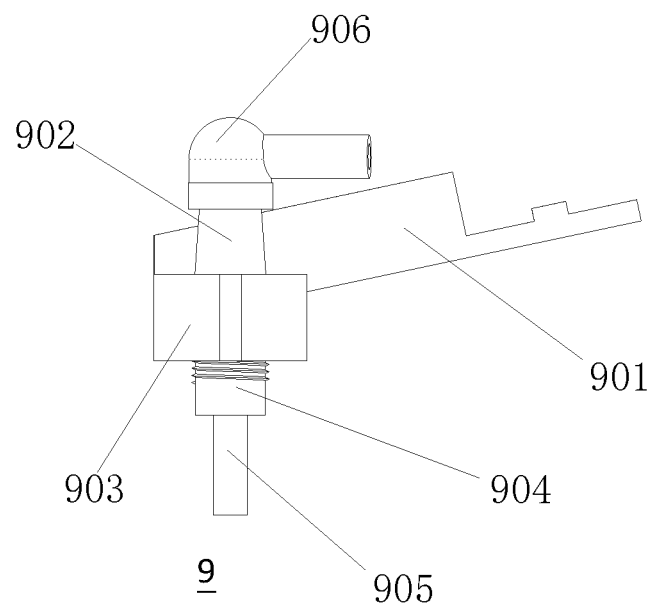
FIG. 15 illustrates a side view of a charging connector.

The power supply module 9 in the body is mounted on the cleaning rack and is used for supplying power to all the electrical parts of the body. The power supply module 9 is further connected with a charging connector for charging the power supply module. As illustrated in FIG. 14 which illustrates a stereoscopic or perspective view of the charging connector, and FIG. 15 which illustrates a side view of the charging connector, the charging connector comprises a connector connecting member 901, a telescopic conductive member, a conductive member insulating housing 902 and a conductive member mounting member 903. The connector connecting member 901 is fixedly connected with the conductive member mounting member 903 and is used for being connected with the cleaning rack. As shown in FIG. 14, threaded holes 9031 are arranged in the two ends of the conductive member mounting member 903, and after the conductive member insulating housing 902 is inserted into the threaded holes 9031, the conductive member insulating housing 902 is fixed on the conductive member mounting member 903 by using hollow insulating nuts 904. The telescopic conductive member comprises a spring and a conductive member 905, the spring is arranged in the conductive member insulating housing 902 and one end of the conductive member 905 is connected with the charging module by using the spring or a conducting wire. Due to the effect or property of the spring, the conductive member 905 may vertically extend and retract in the conductive member insulating housing 902. A waterproof and dustproof cap 906 is further mounted on the conductive member insulating housing 902 to prevent dust and rainwater from entering the conductive member insulating housing 902 and causing the service life of the charging connector to be shortened. The conductive member 905 may be a copper column or a carbon column. The copper column is preferred since it is not easily ruptured and the service life is long.

Figure 16:
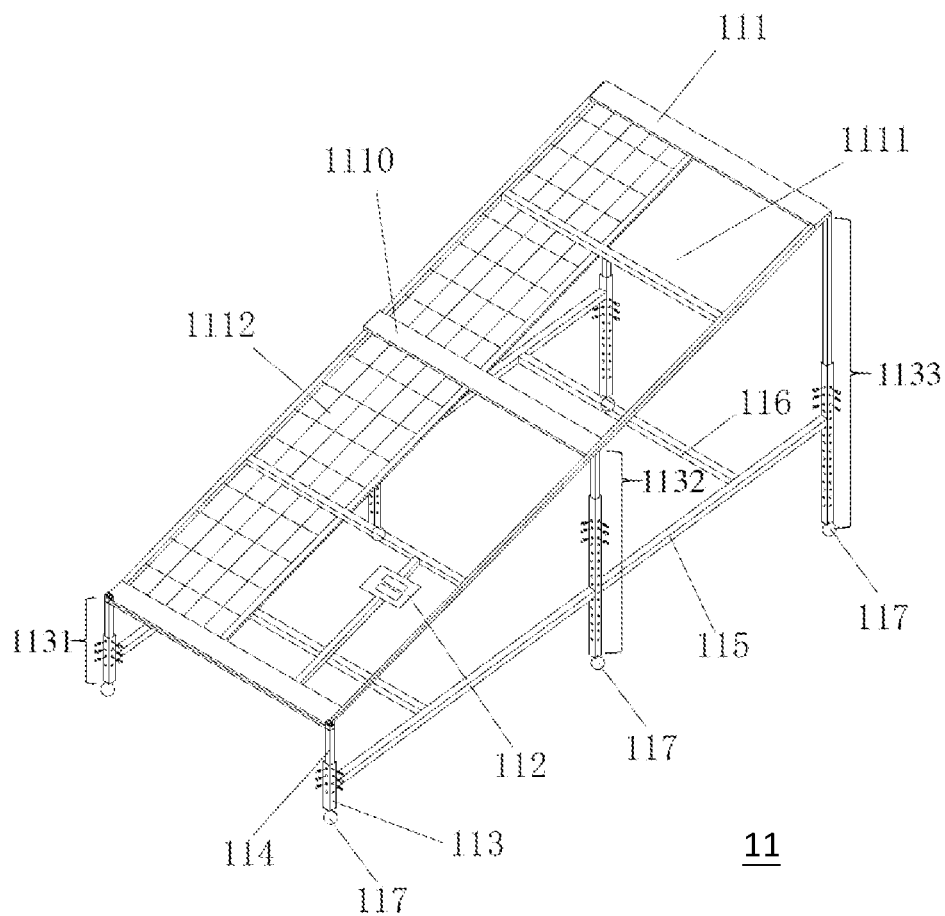
FIG. 16 illustrates a structural schematic view of a charging compartment.

As illustrated in FIG. 16 which illustrates a structural schematic view of the charging compartment 11, the charging compartment is used for stopping the body and recharging/charging battery power in the body. The charging compartment 11 comprises a charging and stopping rack 111 and a telescopic supporting rack. The charging and stopping rack 111 is used for stopping the body and for recharging/charging a battery (not shown) in the body; and the telescopic supporting rack is used for supporting the charging and stopping rack 111 and adjusting the angle of the charging and stopping rack 111 to enable the charging and stopping rack 111 and a photovoltaic panel to be cleaned to be on a same plane. The charging and stopping rack 111 comprises a charging part 1110 and a stopping part 1111. A solar photovoltaic panel 1112 used for charging the body is mounted on the charging part 1110; and the stopping part 1111 is used for stopping the body (so that the body remain stationary or stopped while the recharging/charging process takes place). A photoelectric converter and an electric energy storage device are mounted at a back portion of the charging part 1110, the photoelectric converter is used for converting sunlight energy into electric energy and the electric energy storage device is used for storing the electric energy. A self-charging terminal 112 is detachably mounted on the stopping part 1111. The self-charging terminal 112 is used for being connected with a charging connector.

Figure 17:
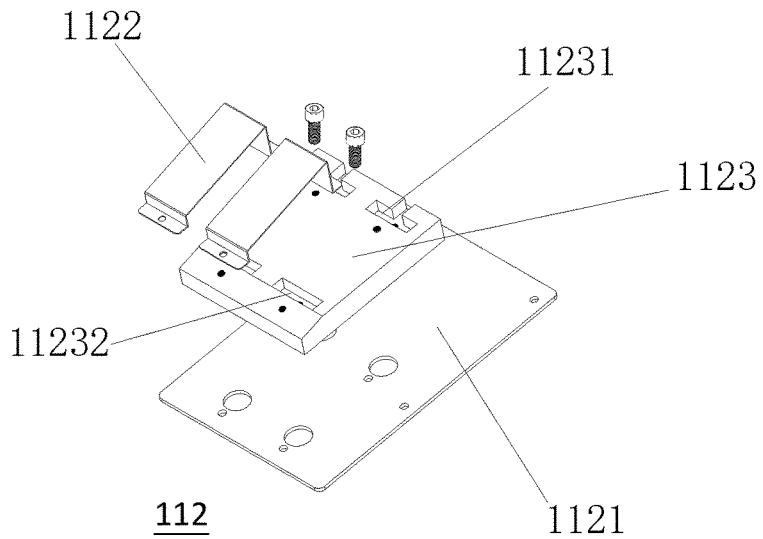
FIG. 17 illustrates a structural exploded schematic view of a self-charging terminal.

As illustrated in FIG. 17 which illustrates a structural exploded schematic view of the self-charging terminal 112, the self-charging terminal 112 comprises a terminal fixing block 1121, a sloped conductive member 1122 and a sloped conductive member mounting member 1123. A first mounting groove 11231 is arranged in one end of the sloped conductive member mounting member 1123 and a second mounting groove 11232 is arranged in the other end. The sloped conductive member mounting member 1123 is fixedly mounted on the terminal fixing block 1121, and the two ends of the sloped conductive member 1122 are respectively mounted in the first mounting groove 11231 and the second mounting groove 11232. The sloped conductive member 1122 is preferably a copper conductive member. The sloped conductive member 1122 is connected with the electric energy storage device by using a conducting wire.

The telescopic supporting rack comprises two first telescopic members 1131 which are symmetrically arranged, two second telescopic members 1132 which are symmetrically arranged and two third telescopic members 1133 which are symmetrically arranged. The upper ends of the two first telescopic members 1131 which are symmetrically arranged are rotatably connected with one end of the charging and stopping rack 111; the two third telescopic members 1133 which are symmetrically arranged are fixedly-connected with the other end of the charging and stopping rack 111; and the two second telescopic members 1132 which are symmetrically arranged are fixedly-mounted at the middle portion of the charging and stopping rack 111. Each of the first telescopic members 1131, the second telescopic members 1132 and the third telescopic members 1133 comprises a sleeve 113 and a telescopic rod 114, a plurality of through holes are arranged in the sleeve 113, a plurality of threaded holes are arranged in the telescopic rod 114, and screws penetrate through different through holes and threaded holes to realize telescopic connection between the telescopic rod 114 and the sleeve 113. A difference lies in that the telescopic rods 114 in the first telescopic members 1131 are rotatably-connected with the charging and stopping rack 111, and while the telescopic rods 114 in the second telescopic members 1132 and the third telescopic members 1133 are all fixedly-connected with the charging and stopping rack 111. Of course, the telescopic fixed connection between the sleeve and the telescopic rod may also be realized through hydraulic connection. Of course, it is not only limited to just these two types of telescopic fixed connection. A plurality of first reinforcing members 115 are further arranged between the first telescopic members 1131, the second telescopic members 1132 and the third telescopic members 1133, two second reinforcing members 116 are further arranged between every two first reinforcing members 115 and thereby the stability of the charging compartment can be increased.

A plurality of universal wheels 117 are arranged at the lower ends of the first telescopic members 1131, the second telescopic members 1132 and the third telescopic members 1133 to facilitate the movement of the charging compartment and improve the mobility and flexibility of the charging compartment.

Before the photovoltaic panel to be cleaned is started to be cleaned, the charging compartment is moved to a position beside the photovoltaic panel to be cleaned, the telescopic supporting rack of the charging compartment is adjusted to enable the charging and stopping rack 111 and the photovoltaic panel to be cleaned to be on the same plane, the body starts photovoltaic panel cleaning process, the body simultaneously cleans the solar photovoltaic panel 1112 on the charging and stopping rack 111 in a process that the body leaves from the charging and stopping rack 111 and enters the photovoltaic panel to be cleaned, and thereby the self-cleaning function of the charging compartment is realized.

When the battery in the body needs to be charged or recharged, after the body is stopped (which means that the body remain stationary or stopped while the recharging/charging process of the (battery of) the photovoltaic panel cleaning equipment takes place) on the charging and stopping rack 111 of the charging compartment, the charging connector on the body will be in contact with the self-charging terminal 112 and thereby the recharging/charging of a battery in the body is realized. Specifically, in the present application, the charging connector comprises two telescopic charging members, the self-charging terminal 112 comprises two sloped conductive members 1122, the two telescopic charging members and the two sloped conductive members 1122 are in contact and are in sliding friction on slopes of the sloped conductive members 1122 when the body is stopped on the charging and stopping rack 111 of the charging compartment, and (due to the fact that shape of the sloped conductive member of the self-charging terminal is specifically matched with the shape of the telescopic charging member) thereby oxidization layers on the sloped conductive members 1122 can be wiped off such that the stable contact between the two telescopic charging members and the two sloped conductive members 1122 is guaranteed, the self-charging terminal 112 of the charging compartment can be prevented from being aged and the service life of the self-charging terminal 112 is prolonged.

Preferred Embodiment 2

Figure 18:
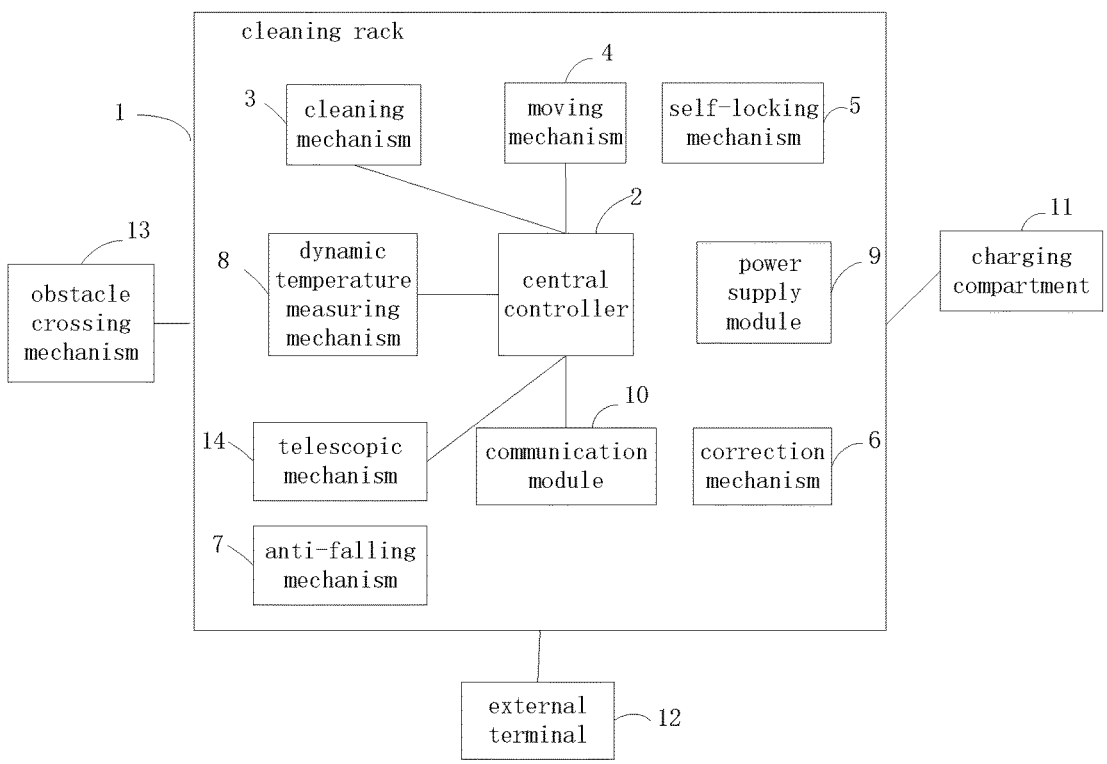
FIG. 18 illustrates a functional diagram of an another photovoltaic panel cleaning equipment in accordance with another embodiment provided by the present invention.

As illustrated in FIG. 18 which illustrates a functional diagram of another photovoltaic panel cleaning equipment disclosed by the present invention, a difference between the photovoltaic panel cleaning equipment disclosed by this embodiment and the photovoltaic panel cleaning equipment disclosed in embodiment 1 lies in that the photovoltaic panel cleaning equipment disclosed by this embodiment further comprises an obstacle crossing mechanism 13 and a telescopic mechanism 14 arranged on the cleaning rack 1. The obstacle crossing mechanism 13 is used for enabling the body to smoothly pass through a space between two photovoltaic panel arrays. The telescopic mechanism 14 is connected with the central controller 2, is used for enabling the body to move on the obstacle crossing mechanism 13 and cooperates with the obstacle crossing mechanism 13 to enable the body to smoothly pass through a space between two dislocated photovoltaic panel arrays. Sometimes, since photovoltaic panel arrays not only have a certain distance therebetween but also are possibly dislocated in height, through the cooperation between the obstacle crossing mechanism 13 and the telescopic mechanism 14 in the present application, the body can be enabled to smoothly move or travel from one photovoltaic panel array to another photovoltaic panel array.

Figure 19:
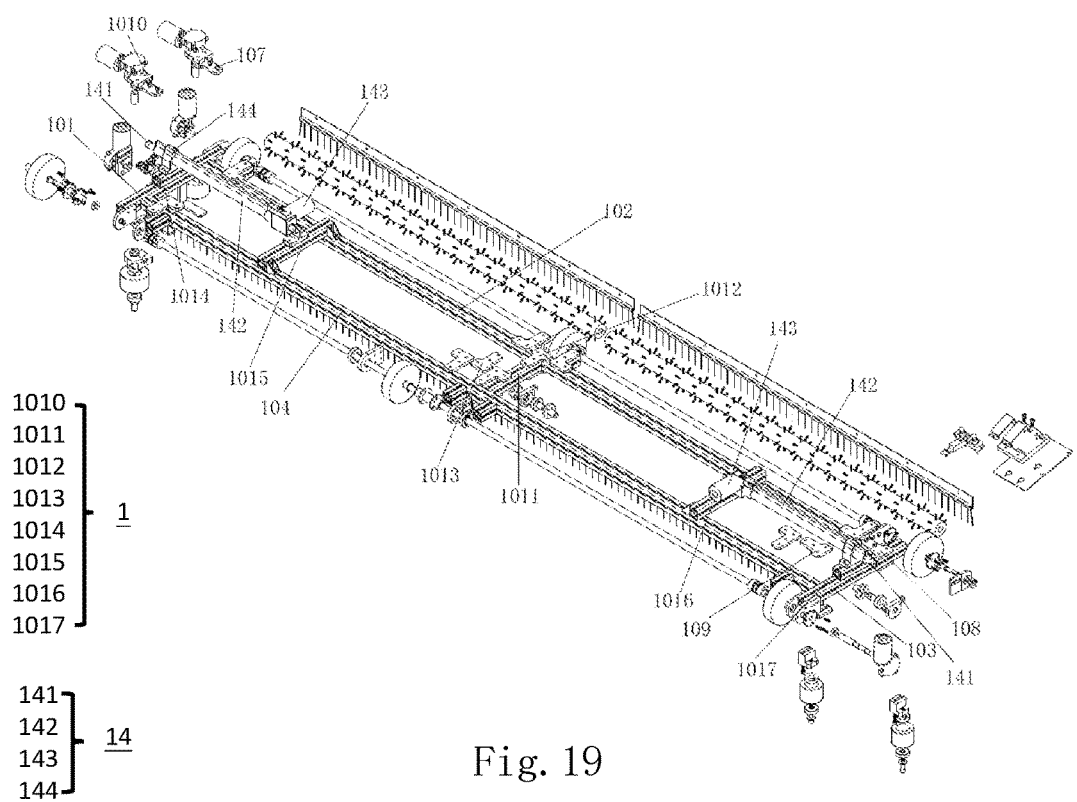
FIG. 19 illustrates a structural schematic view of a telescopic mechanism mounted on the cleaning rack.

As illustrated in FIG. 19 which illustrates a structural schematic view of the telescopic mechanism 14 mounted on the cleaning rack, the telescopic mechanism comprises a first telescopic unit and a second telescopic unit, each of the first telescopic unit and the second telescopic unit comprises a telescopic part 141, a housing part 142 and a power part 143, and the telescopic part 141 is located in the housing part 142 and can make telescopic motion under the drive of the power part 143. A first fixed rod 1014 is arranged on the first connecting rod 101 of the cleaning rack 1, a second fixed rod 1015 and a third fixed rod 1016 are arranged between the second connecting rod 102 and the fourth connecting rod 104 of the cleaning rack 1, and a fourth fixed rod 1017 is arranged on the third connecting rod 103 of the cleaning rack 1. The first telescopic unit is detachably mounted between the first fixed rod 1014 and the second fixed rod 1015. The second telescopic unit is detachably mounted between the third fixed rod 1016 and the fourth fixed rod 1017. In the present application, the first telescopic unit is a first linear motor and the second telescopic unit is a second linear motor. The first linear motor and the second linear motor are both connected with the central controller 2, and the central controller 2 controls the first linear motor and the second linear motor to work.

Figure 20:
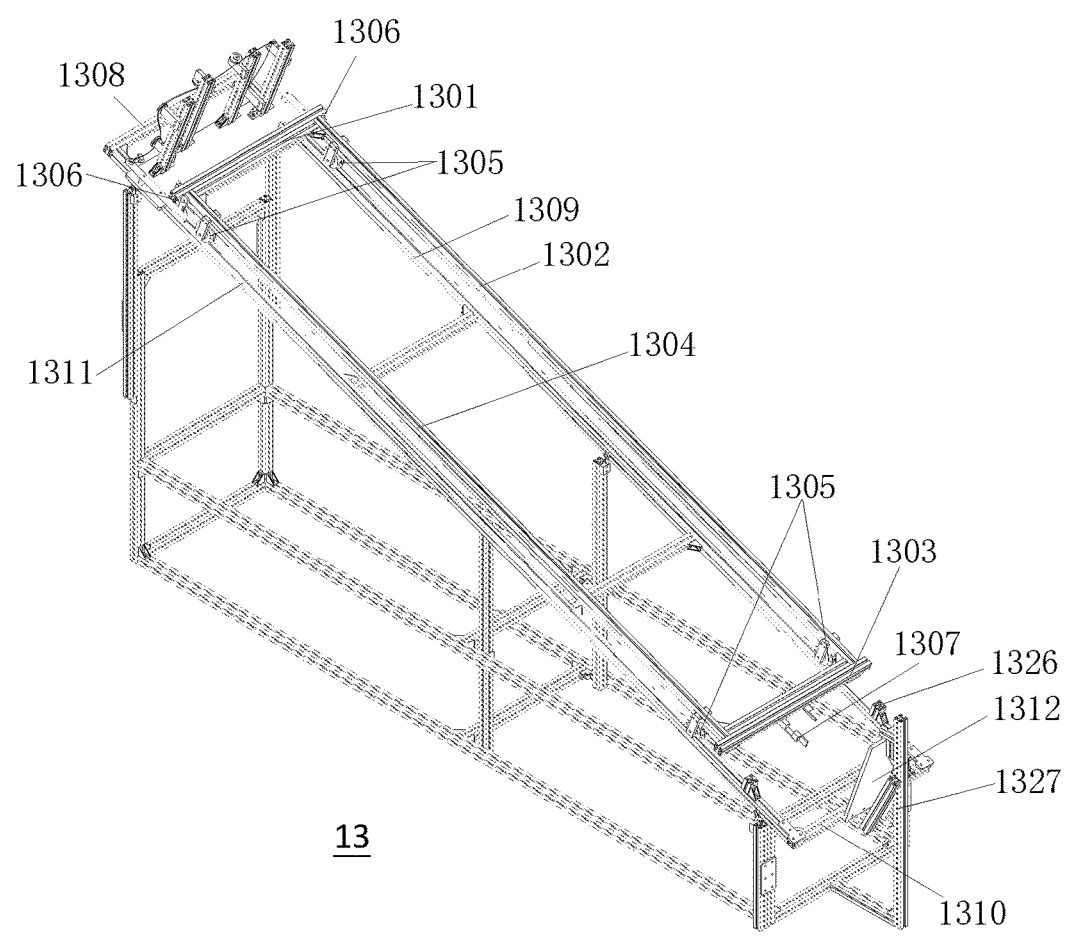
FIG. 20 illustrates a structural schematic view of an obstacle crossing mechanism.

As illustrated in FIG. 20 which illustrates a structural schematic view of the obstacle crossing mechanism, the obstacle crossing mechanism 13 is used for temporarily stopping the body and cooperating with the telescopic mechanism 14 to realize the movement of the body from a photovoltaic panel at a lower position to a photovoltaic panel at a higher position, or from a photovoltaic panel at a higher position to a photovoltaic panel at a lower position.

The obstacle crossing mechanism 13 comprises a moving rack and a fixed rack. The moving rack is used for temporarily stopping the body; and the fixed rack is used for storing the moving rack and cooperating with the telescopic mechanism to realize ascending or descending of the moving rack. The moving rack comprises a first connecting member 1301, a second connecting member 1302, a third connecting member 1303 and a fourth connecting member 1304. The first connecting member 1301, the second connecting member 1302, the third connecting member 1303 and the fourth connecting member 1304 are connected end to end to form a rectangular frame, and a moving wheel 1305 is arranged on each of the second connecting member 1302 and the fourth connecting member 1304. A limiting member 1306 is arranged on each of the second connecting member 1302 and the fourth connecting member 1304. A sensor support 1307 is arranged on the third connecting member 1303 and is used for storing a sensor (not shown), the sensor is connected with the central controller 2 and the sensor is used for detecting whether the body is stopped on the moving rack. The fixed rack comprises a bearing rack and a bearing supporting rack. The bearing rack comprises a first bearing connecting rod 1308, a second bearing connecting rod 1309, a third bearing connecting rod 1310 and a fourth bearing connecting rod 1311. The first bearing connecting rod 1308, the second bearing connecting rod 1309, the third bearing connecting rod 1310 and the fourth bearing connecting rod 1311 are connected end to end to form a rectangular frame. A locking device is further arranged on the bearing rack, and the locking device is fixedly arranged between the second bearing connecting rod 1309 and the fourth bearing connecting rod 1311. The locking device cooperates with the limiting member 1306 to lock the moving rack on the fixed rack. A baffle 1312 is fixedly arranged on the third bearing connecting rod 1310.

Figure 21:
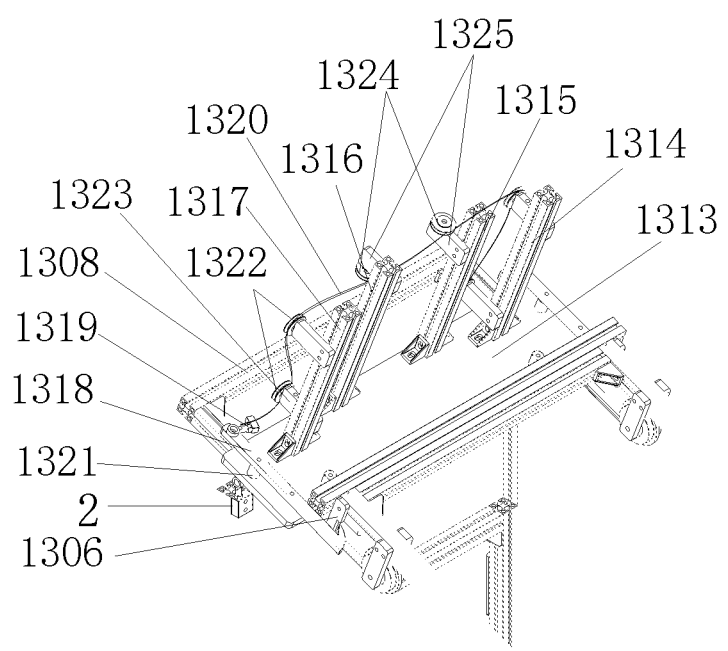
FIG. 21 illustrates a partially enlarged view of the obstacle crossing mechanism.

As illustrated in FIG. 21 which illustrates a partially enlarged view of the obstacle crossing mechanism 13, the locking device disposed or configured on the obstacle crossing mechanism 13 comprises a bottom plate 1313, a first stand column 1314, a second stand column 1315, a third stand column 1316, a fourth stand column 1317, a locking hook 1318, a rotary force applying member 1319, a restoring member and a pulling rope 1320. One end of the bottom plate 1313 is fixed on the second bearing connecting rod 1309 and the other end is fixed on the fourth bearing connecting rod 1311. A fixed column 1321 is arranged on each of two sides of the bottom plate 1313. The locking hook 1318 is rotatably connected with the fixed column 1321 and is used for locking the limiting member 1306. The rotary force applying member 1319 is connected with one end of the locking hook 1318 and can outwards pull away the locking hook 1318 under an effect of external force to unlock the limiting member 1306. The restoring member is arranged at a junction between the rotary force applying member 1319 and the locking hook 1318, and when the external force acting on the rotary force applying member 1319 disappears, the restoring member enables the locking hook 1318 to be inwards restored. The restoring mechanism is a torsion spring. The first stand column 1314 and the fourth stand column 1317 are respectively fixed at the two ends of the bottom plate 1313, two vertical pulleys 1322 are arranged on each of the stand columns, the two vertical pulleys 1322 are respectively located at a higher position and a lower position on the stand column, the two vertical pulleys 1322 are detachably mounted on the stand column by using a first fixed block 1323 and the two vertical pulleys 1322 are both mounted at one end of the first fixed block 1323. The second stand column 1315 and the third stand column 1316 are arranged between the first stand column 1314 and the fourth stand column 1317, a horizontal pulley 1324 is arranged on each of the second stand column 1315 and the third stand column 1316, and the horizontal pulley 1324 is detachably mounted on each stand column by using a second fixed block 1325, wherein the horizontal pulley 1324 of the second stand column 1325 is arranged above one end of the second fixed block 1325 and the horizontal pulley 1324 of the third stand column 1316 is arranged below one end of the second fixed block 1325. One end of the pulling rope 1320 is fixedly connected with one rotary force applying member 1319, and the other end is wound around the vertical pulleys 1322 and the horizontal pulleys 1324 and then is fixedly connected with the other rotary force applying member. The structure of the locking device is simple and the stability is reliable. By arranging the vertical pulleys and the horizontal pulleys, the pulling rope is not to easily depart from the pulleys and the continuous application of force to the rotary force applying members 1319 is guaranteed.

The bearing supporting rack is used for supporting the bearing rack and is rotatably connected with the bearing rack. Supporting legs of the bearing supporting rack are adjustable in height. A resisting rack 1327 is further arranged on the bearing supporting rack and is used for resisting against the baffle 1312 and preventing the baffle 1312 from being inclined when the telescopic part of the second telescopic unit presses against the baffle 1312.

When the body moves from a photovoltaic panel at a low position to a photovoltaic panel at a high position, the body firstly moves from the photovoltaic panel at the low position to the moving rack, the sensor on the moving rack senses that the body moves onto the moving rack and sends a signal to the central controller, the central controller controls the body to be immobilized on the moving rack, then the central controller controls the second telescopic unit to enable the telescopic part 141 of the second telescopic unit to continuously stretch out, the telescopic part 141 presses against the baffle 1312 to enable the moving rack to slowly move up along the bearing rack until the limiting member 1306 on the moving rack presses the locking hook 1318 to open, the locking hook 1318 clamps the limiting member 1306 when the locking hook 1318 is restored under the effect of the restoring member, at this moment the central controller 2 controls the telescopic part 141 of the second telescopic unit to retract, the moving rack cannot slide down since the locking hook 1318 has already clamped the limiting member 1306, then the central controller 2 controls the body to move from the moving rack to the photovoltaic panel at the high position, and thereby the obstacle crossing function that the body moves from the photovoltaic panel at the low position to the photovoltaic panel at the high position is realized.

When the body moves from a photovoltaic panel at a high position to a photovoltaic panel at a low position, the body firstly moves from the photovoltaic panel at the high position to the moving rack, the sensor on the moving rack senses that the body moves onto the moving rack and sends a signal to the central controller, the central controller controls the body to be immobilized on the moving rack, then the central controller firstly controls the second telescopic unit to enable the telescopic part 141 of the second telescopic unit to continuously stretch out, the telescopic part 141 presses against the baffle 1312, then the first telescopic unit is controlled to enable the telescopic part of the first telescopic unit to continuously stretch out, the pulling rope 1320 is clamped in the groove in the telescopic part, the pulling rope 1320 applies force to the rotary force applying member 1319 through the vertical pulleys 1322 and the horizontal pulleys 1324, the rotary force applying member 1319 then outwards pulls the locking hook 1318 to open to enable the locking hook 1318 to be separated from the limiting member 1306, then the telescopic part of the second telescopic unit is enabled to slowly retract, the moving rack slows moves down along the bearing rack under the effect of gravity until the moving rack is stopped by a limiting stop block 1326 on the bearing rack, thereafter the central controller controls the body to move from the moving rack to the photovoltaic panel at the low position, and thereby the obstacle crossing function that the body moves from the photovoltaic panel at the high position to the photovoltaic panel at the low position is realized.

Many of the structural schematic views shown in figures, which include FIGS. 2, 3, 4, 5, 6B, 7, 8, 9, 11, 14, 16, 17, 19, 20, 21, are expressly shown in (3D) perspective views for the sake of clarity. Although the present invention is described in detail with reference to the above-mentioned embodiments, one skilled in the art may still make amendment to the technical solution recorded in each embodiment or make equivalent replacement to partial technical features therein. However, any amendment, equivalent replacement, improvement and the like made within the spirit and rule of the present invention shall be still included in the protection scope of the present invention.

What is claimed is:

1. An obstacle crossing mechanism in combination with a cleaning rack of a photovoltaic panel cleaning equipment configured to clean a plurality of photovoltaic panel arrays, the cleaning rack comprising:
at least one brush configured to clean the photovoltaic panel arrays;
a first connecting rod, a second connecting rod, a third connecting rod and a fourth connecting rod which are detachably connected to form a generally rectangular frame;
a first fixed rod being arranged on the first connecting rod, a second fixed rod and a third fixed rod being arranged between the second connecting rod and the fourth connecting rod, a fourth fixed rod being arranged on the third connecting rod; and the obstacle crossing mechanism, comprising:
an inclined generally rectangular moving rack; and a fixed rack which supports and elevates the moving rack above a support surface,
wherein the moving rack is used for temporarily supporting the cleaning rack when the cleaning rack moves from a first photovoltaic panel onto the moving rack; and the fixed rack is located below the moving rack and the moving rack ascends or descends on the fixed rack along a sloped path so that the cleaning rack supported on the moving rack can move to a higher elevation or lower elevation and move off the moving rack in order to clean a second photovoltaic panel that is above or below the first photovoltaic panel.

2. The obstacle crossing mechanism according to claim 1, wherein the moving rack comprises a first connecting member, a second connecting member, a third connecting member and a fourth connecting member, and the first connecting member, the second connecting member, the third connecting member and the fourth connecting member form a rectangular frame.

3. The obstacle crossing mechanism according to claim 2, wherein a moving wheel and a limiting member are arranged on each of the second connecting member and the fourth connecting member.

4. The obstacle crossing mechanism according to claim 2, wherein a sensor support used for mounting a sensor is arranged on the third connecting member.

5. The obstacle crossing mechanism according to claim 1, wherein the fixed rack comprises a bearing rack and a bearing supporting rack, and the bearing supporting rack is located below the bearing rack and is rotatably connected with the bearing rack.

6. The obstacle crossing mechanism according to claim 3, wherein the bearing rack comprises a first bearing connecting rod, a second bearing connecting rod, a third bearing connecting rod and a fourth bearing connecting rod; and a locking device is arranged between the second bearing connecting rod and the fourth bearing connecting rod, and the locking device cooperates with the limiting member to lock the moving rack on the fixed rack.

7. The obstacle crossing mechanism according to claim 6, wherein the locking device comprises a bottom plate, a locking hook, a rotary force applying member and a restoring member; one end of the bottom plate is fixed on the second bearing connecting rod and the other end is fixed on the fourth bearing connecting rod; a fixed column is arranged on the bottom plate and the locking hook is rotatably connected with the fixed column; the rotary force applying member is connected with one end of the locking hook and the rotary force applying member outwards pulls away the locking hook under an effect of external force to unlock the limiting member; and the restoring member is arranged at a junction between the rotary force applying member and the locking hook, and when the external force acting on the rotary force applying member disappears, the restoring member enables the locking hook to be restored.

8. The obstacle crossing mechanism according to claim 7, wherein the locking device further comprises a first stand column, a second stand column, a third stand column and a fourth stand column which are fixed on the bottom plate; the first stand column and the fourth stand column are located at two ends of the bottom plate, and the second stand column and the third stand column are located between the first stand column and the fourth stand column; two vertical pulleys which are respectively at a high position and a low position are arranged on each of the first stand column and the fourth stand column; and a horizontal pulley is arranged on each of the second stand column and the third stand column.

9. The obstacle crossing mechanism according to claim 8, wherein the locking device further comprises a pulling rope, and the pulling rope is wound on the vertical pulleys and the horizontal pulleys and then is connected with the rotary force applying member.

10. An obstacle crossing mechanism in combination with a cleaning rack of a photovoltaic panel cleaning equipment configured for cleaning a plurality of photovoltaic panel arrays, the cleaning rack comprising a first connecting rod, a second connecting rod, a third connecting rod and a fourth connecting rod which are detachably connected,
wherein a first fixed rod being arranged on the first connecting rod, a second fixed rod and a third fixed rod being arranged between the second connecting rod and the fourth connecting rod, a fourth fixed rod being arranged on the third connecting rod, and a telescopic mechanism;
the obstacle crossing mechanism, comprising: a moving rack; and
a fixed rack,
wherein the moving rack is used for temporarily supporting the cleaning rack; and the fixed rack is located below the moving rack and the moving rack ascends or descends on the fixed rack; and
the telescopic mechanism, comprising:
a first telescopic unit, the first telescopic unit comprises a telescopic part, a housing part and a power part, and the telescopic part is located in the housing part and provides telescopic motion under the drive of the power part; and a second telescopic unit, the second telescopic unit comprises a telescopic part, a housing part and a power part, and the telescopic part is located in the housing part and provides telescopic motion under the drive of the power part,
wherein the first telescopic unit is detachably-mounted between the first fixed rod and the second fixed rod of the cleaning rack, and the second telescopic unit is detachably-mounted between the third fixed rod and the fourth fixed rod of the cleaning rack, wherein the obstacle crossing mechanism and the telescopic mechanism operate together to facilitate the photovoltaic panel cleaning equipment to automatically travel from one photovoltaic panel array to reach another photovoltaic panel array during a cleaning process of photovoltaic panels without requiring any human assistance.

\* \* \* \* \*